(12) United States Patent
Vijayan et al.

(10) Patent No.: US 7,907,593 B2
(45) Date of Patent: Mar. 15, 2011

(54) STAGGERED PILOT TRANSMISSION FOR CHANNEL ESTIMATION AND TIME TRACKING

(75) Inventors: Rajiv Vijayan, Del Mar, CA (US); Ashok Mantravadi, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 157 days.

(21) Appl. No.: 12/254,680

(22) Filed: Oct. 20, 2008

(65) Prior Publication Data

US 2009/0129511 A1 May 21, 2009

Related U.S. Application Data

(62) Division of application No. 10/926,884, filed on Aug. 25, 2004, now Pat. No. 7,457,231.

(60) Provisional application No. 60/568,324, filed on May 4, 2004.

(51) Int. Cl.
*H04J 3/06* (2006.01)
(52) U.S. Cl. ....................................... 370/350
(58) Field of Classification Search .......... 370/203–210, 370/335, 350, 503–312; 375/354, 355, 362
See application file for complete search history.

(56) References Cited

U.S. PATENT DOCUMENTS

| | | | |
|---|---|---|---|
| 5,303,263 A | 4/1994 | Shoji et al. | |
| 5,488,635 A | 1/1996 | Chennakeshu et al. | |
| 5,732,113 A | 3/1998 | Schmidl et al. | |
| 6,654,428 B1 | 11/2003 | Bose et al. | |
| 6,654,429 B1 | 11/2003 | Li | |
| 6,654,728 B1 | 11/2003 | Li et al. | |
| 6,684,173 B2 | 1/2004 | Kessenich et al. | |

(Continued)

FOREIGN PATENT DOCUMENTS

EP     0938208     8/1999

(Continued)

OTHER PUBLICATIONS

Mostofi, Y, et al.: "Effect of Frame Synchronization Errors on Pilot-Aided Channel Estimation in OFDM: Analysis and Solution" Wireless personal Multimedia Communications, 2002. The 5th International Symposium on Oct. 27-30, 2002, Piscataway, NJ, USA, IEEE.

(Continued)

*Primary Examiner* — Frank Duong
(74) *Attorney, Agent, or Firm* — Stanton Braden; Peng Zhu

(57) ABSTRACT

To allow a receiving entity to derive a longer channel estimate while limiting overhead, a transmitting entity transmits a pilot on different groups of subbands in different time intervals. N subbands in the system are arranged into M non-overlapping groups. Each group includes P=N/M subbands that are uniformly distributed across the N subbands. The transmitting entity transmits the pilot on a different subband group in each time interval, and selects all M subband groups in M time intervals based on a pilot staggering pattern. The receiving entity derives (1) an initial impulse response estimate with P channel taps based on the pilot received on one subband group and (2) two longer impulse response estimates with different lengths used for data detection and time tracking. Each longer impulse response estimate may be derived by filtering initial impulse response estimates for a sufficient number of subband groups using a time-domain filter.

30 Claims, 10 Drawing Sheets

U.S. PATENT DOCUMENTS

| | | | |
|---|---|---|---|
| 6,954,481 B1 | 10/2005 | Laroia et al. | |
| 7,012,882 B2 * | 3/2006 | Wang et al. | 370/208 |
| 7,020,226 B1 | 3/2006 | Kirkland | |
| 7,049,404 B2 | 5/2006 | Mao et al. | |
| 7,139,331 B2 | 11/2006 | Kolze | |
| 7,180,965 B2 | 2/2007 | Eilts et al. | |
| 7,200,190 B2 | 4/2007 | Malette et al. | |
| 7,324,606 B2 | 1/2008 | Eilts et al. | |
| 7,339,999 B2 | 3/2008 | Gore et al. | |
| 7,352,821 B2 | 4/2008 | Kannan et al. | |
| 2005/0063298 A1 | 3/2005 | Ling et al. | |
| 2005/0135308 A1 | 6/2005 | Vijayan et al. | |
| 2005/0135509 A1 | 6/2005 | Mantravadi et al. | |
| 2005/0163258 A1 * | 7/2005 | Gore et al. | 375/340 |

FOREIGN PATENT DOCUMENTS

| | | |
|---|---|---|
| EP | 1320232 | 6/2003 |
| JP | 2000068975 A | 3/2000 |
| JP | 2002009724 A | 1/2002 |
| JP | 2003134086 A | 5/2003 |
| JP | 2004007353 A | 1/2004 |
| WO | WO9800946 | 1/1998 |

OTHER PUBLICATIONS

Sandell, et al: "A Comparative Study of Pilot-Based Channel Estimators for Wireless OFDM" Research Report Tulea, Division of Signal Processing, No. 19, Sep. 1, 1996.

International Search Report—PCT/US05/014259, International Search Authority—European Patent Office, Aug. 1, 2005.

International Preliminary Report on Patentability, PCT/US2005/014259, The International Bureau of WIPO Nov. 7, 2006.

Written Opinion PCT/US2005/014259, International Search Authority Europeoan Patent Office, Apr. 11, 2006.

European Standard (Telecommunications series), "Digital Video Broadcasting (DVB); Framing structure, channel coding and modulation for digital terrestrial television", ETSI EN 300 744 v1.4.1 (Jan. 2001), section 4.5.3.

Dukhyun Kim et al.: "Residual ISI Cancellation for OFDM with Applications to HDTV Broadcasting," Oct. 1998; XP002159671.

Hunter et al., "Channel Estimation for Mobile OFDM Systems," IEEE, Vehicular Technology Conference, 1:305-309 (Sep. 19, 1999).

Ryu et al.: "Comparison of two FFT structures for Fractionally-spaced frequency domain Equalizer," pp. 1710-1713 May 6, 2002.

* cited by examiner

STAGGERED PILOT TRANSMISSION FOR CHANNEL ESTIMATION AND TIME TRACKING

CROSS-REFERENCE TO RELATED APPLICATION

This application is a divisional application of U.S. patent application Ser. No. 10/926,884, filed Aug. 25, 2004 which claims priority to U.S. Provisional Patent Application Ser. No. 60/568,324, filed May 4, 2004, which is incorporated herein by reference in its entirety.

BACKGROUND

I. Field

The present invention relates generally to data communication, and more specifically to pilot transmission, channel estimation, and time tracking in a multi-carrier communication system.

II. Background

Orthogonal frequency division multiplexing (OFDM) is a multi-carrier modulation technique that effectively partitions the overall system bandwidth into multiple orthogonal frequency subbands. These subbands are also referred to as tones, subcarriers, bins, and frequency channels. With OFDM, each subband is associated with a respective subcarrier that may be modulated with data.

In an OFDM system, a transmitting entity processes data to obtain modulation symbols and further performs OFDM modulation on the modulation symbols to generate OFDM symbols. The transmitting entity then conditions and transmits the OFDM symbols via a communication channel. A receiving entity typically needs to obtain relatively accurate symbol timing in order to recover the data sent by the transmitting entity. The receiving entity often does not know the time at which each OFDM symbol is sent by the transmitting entity nor the propagation delay introduced by the communication channel. The receiving entity would then need to ascertain the timing of each OFDM symbol received via the communication channel in order to properly perform the complementary OFDM demodulation on the received OFDM symbol. The receiving entity also needs a good estimate of the response of the communication channel in order to perform data detection to obtain good estimates of the modulation symbols sent by the transmitting entity.

The transmitting entity expends system resources to support channel estimation and time tracking, and the receiving entity also consumes resources to perform these tasks. The resources used by the transmitting and receiving entities for channel estimation and time tracking represent overhead. Thus, it is desirable to minimize the amount of resources expended by both the transmitting and receiving entities for these tasks.

There is therefore a need in the art for techniques to efficiently support channel estimation and time tracking in an OFDM system.

SUMMARY

Techniques for performing "staggered" pilot transmission, channel estimation, and time tracking in a multi-carrier (e.g., OFDM) communication system are described herein. To allow a receiving entity to derive a longer channel estimate while limiting the amount of resources expended for pilot transmission, a transmitting entity may transmit a pilot on different groups of subbands in different time intervals (e.g., different symbol periods). N subbands in the system may be arranged into M non-overlapping groups. Each group may include P=N/M subbands that are distributed across the N subbands. The transmitting entity may transmit the pilot on a different subband group in each time interval. The transmitting entity may select all M subband groups in M time intervals based on a pilot staggering pattern. Alternatively, the transmitting entity may use many or most of the M subband groups in different time intervals, so that a substantial number of all subbands usable for transmission in the system are used for pilot transmission in different time intervals. The substantial number of subbands may be, for example, all of the usable subbands, three quarter of the usable subbands, at least half of the usable subbands, or some other significant percentage of the usable subbands. The receiving entity may derive an initial impulse response estimate with P channel taps based on the pilot received on one subband group. The receiving entity may derive a longer impulse response estimate (with up to N channel taps) by filtering initial impulse response estimates obtained for a sufficient number of different subband groups, as described below.

The receiving entity may derive two longer impulse response estimates of two different lengths $L_1$ and $L_2$, which may be used for data detection/decoding and time tracking respectively, where $L_1 = S_1 \cdot P$ and $L_2 = S_2 \cdot P$. Each longer impulse response estimate may be derived based on a different time-domain filter that filters S or more initial impulse response estimates obtained for S or more different subband groups, where S may be $S_1$ or $S_2$. For each longer impulse response estimate, the first P channel taps are for a "main channel", and the remaining channel taps are for an "excess channel". The coefficients for each time-domain filter may be selected based on various criteria. For example, the coefficients for the main channel may be selected to (1) cancel the excess channel, (2) suppress time variation in the main channel, (3) provide an unbiased estimate of the main channel, and so on. Details of the filtering are described below. Various aspects and embodiments of the invention are also described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
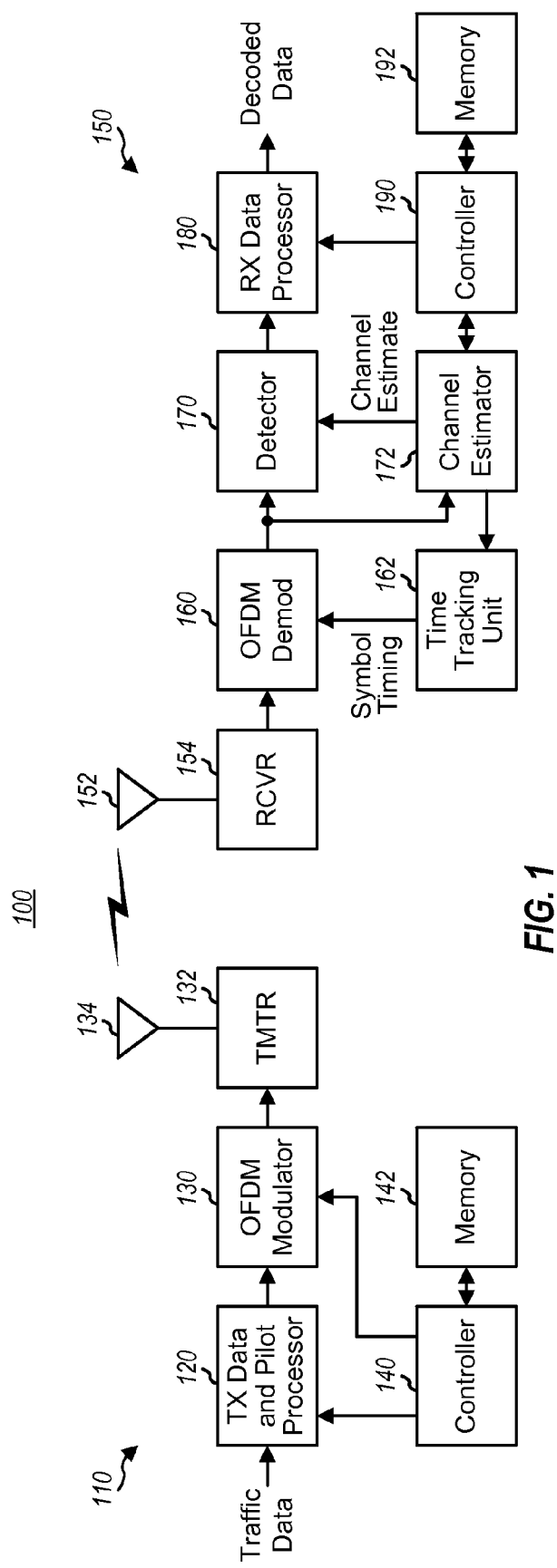
FIG. 1 shows a block diagram of a transmitting entity and a receiving entity.

FIG. 1 shows a block diagram of a transmitting entity 110 and a receiving entity 150 in an OFDM system 100. Transmitting entity 110 may be a base station or a wireless device, and receiving entity 150 may also be a base station or a wireless device. A base station is generally a fixed station and may also be referred to as a base transceiver system (BTS), an access point, or some other terminology. A wireless device may be fixed or mobile and may also be referred to as a user terminal, a mobile station, or some other terminology.

At transmitting entity 110, a transmit (TX) data and pilot processor 120 receives different types of data (e.g., traffic/packet data and overhead/control data) and processes (e.g., encodes, interleaves, and symbol maps) the data to generate data symbols. As used herein, a "data symbol" is a modulation symbol for data, a "pilot symbol" is a modulation symbol for pilot (which is data that is known a priori by both the transmitting and receiving entities), and a modulation symbol is a complex value for a point in a signal constellation for a modulation scheme (e.g., M-PSK, M-QAM, and so on). Processor 120 provides data and pilot symbols to an OFDM modulator 130.

OFDM modulator 130 multiplexes the data and pilot symbols onto the proper subbands and further performs OFDM modulation on the multiplexed symbols to generate OFDM symbols. For each symbol period, OFDM modulator 130 performs an N-point inverse fast Fourier transform (IFFT) on N multiplexed symbols for N total subbands and obtains a "transformed" symbol that contains N time-domain samples. Each sample is a complex value to be transmitted in one sample period. OFDM modulator 130 then repeats a portion of each transformed symbol to form an OFDM symbol that contains N+C samples, where C is the number of samples being repeated. The repeated portion is often called a cyclic prefix and is used to combat inter-symbol interference (ISI) caused by frequency selective fading. An OFDM symbol period (or simply, a symbol period) is the duration of one OFDM symbol and is equal to N+C sample periods. OFDM modulator 130 provides a stream of OFDM symbols to a transmitter unit (TMTR) 132. Transmitter unit 132 processes (e.g., converts to analog, amplifies, filters, and frequency upconverts) the OFDM symbol stream to generate a modulated signal, which is then transmitted from an antenna 134.

At receiving entity 150, the transmitted signal from transmitting entity 110 is received by an antenna 152 and provided to a receiver unit (RCVR) 154. Receiver unit 154 processes (e.g., filters, amplifies, frequency downconverts, and digitizes) the received signal and provides a stream of input samples. An OFDM demodulator (Demod) 160 performs OFDM demodulation on the input samples and provides received data and pilot symbols. A detector 170 performs data detection (e.g., equalization or matched filtering) on the received data symbols with a channel estimate from a channel estimator 172 and provides detected data symbols, which are estimates of the data symbols sent by transmitting entity 110. A receive (RX) data processor 180 processes (e.g., symbol demaps, deinterleaves, and decodes) the detected data symbols and provides decoded data. In general, the processing by OFDM demodulator 160 and RX data processor 180 is complementary to the processing by OFDM modulator 130 and TX data and pilot processor 120, respectively, at transmitting entity 110.

Channel estimator 172 derives impulse response estimates based on the received pilot symbols from OFDM demodulator 160 and further derives frequency response estimates used by detector 170. A synchronization unit 162 performs time tracking and determines symbol timing based on the impulse response estimates from channel estimator 172. OFDM demodulator 160 performs OFDM demodulation based on the symbol timing from unit 162.

Controllers 140 and 190 direct operation at transmitting entity 110 and receiving entity 150, respectively. Memory units 142 and 192 provide storage for program codes and data used by controllers 140 and 190, respectively.

Data and pilot may be transmitted in various manners in system 100. For example, data and pilot may be transmitted (1) simultaneously in the same symbol period using frequency division multiplexing (FDM), (2) sequentially in different symbol periods using time division multiplexing (TDM), or (3) using a combination of FDM and TDM. The N total subbands may also be used for data and pilot transmission in various manners. An exemplary data/pilot transmission scheme is described below.

Figure 2:
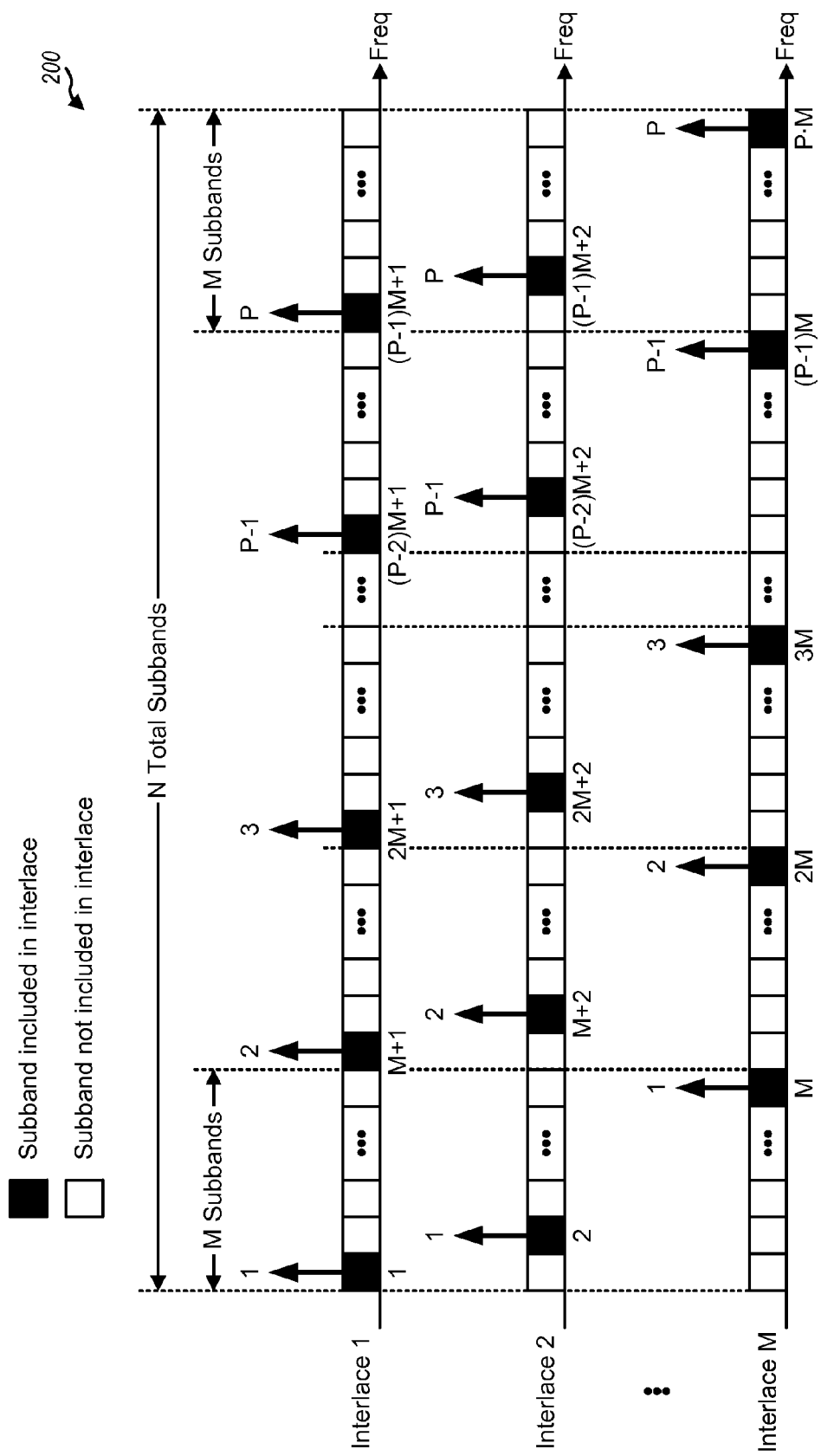
FIG. 2 shows an interlace subband structure.

FIG. 2 shows an interlace subband structure 200 that may be used for data and pilot transmission in system 100. System 100 has an overall system bandwidth of BW MHz, which is partitioned into N orthogonal frequency subbands using OFDM. Each subband has a bandwidth of BW/N MHz. Of the N total subbands, only U subbands may be used for data and pilot transmission, where U≦N, and the remaining G=N−U subbands may be unused and serve as guard subbands. As a specific example, system 100 may utilize an OFDM structure with N=4096 total subbands, U=4000 usable subbands, and G=96 guard subbands. For simplicity, the following description assumes that all N subbands may be used for data and pilot transmission. These N subbands are assigned indices of k=1 . . . N.

The N total subbands may be arranged into M "interlaces" or disjoint subband groups. The M interlaces are disjoint or non-overlapping in that each of the N total subbands belongs in only one interlace. Each interlace contains P subbands, where P·M=N. The M interlaces are given indices of m=1 . . . M, and the P subbands in each interlace are given indices of p=1 . . . P.

The P subbands for each interlace may be uniformly distributed across the N total subbands such that consecutive subbands in the interlace are spaced apart by M subbands. Each interlace m, for m=1 . . . M, may include P subbands with the following k indices:

$$(p-1)\cdot M+m, \text{ for } p=1\ldots P. \qquad \text{Eq (1)}$$

As shown in FIG. 2, interlace 1 contains subbands with indices k=1, M+1, 2M+1, and so on, interlace 2 contains subbands with indices k=2, M+2, 2M+2, and so on, and interlace M contains subbands with indices k=M, 2M, 3M, and so on. The P subbands in each interlace are thus interlaced with the P subbands in each of the other M−1 interlaces. Each interlace is further associated with a staggering phase m, which is equal to the index k of the first subband in the interlace.

In general, system 100 may utilize any OFDM structure with any number of total, usable, and guard subbands. Any number of interlaces may also be formed. Each interlace may contain any number of subbands and any one of the N total subbands. The interlaces may contain the same or different numbers of subbands. For clarity, the following description is for the interlace subband structure shown in FIG. 2 with M interlaces and each interlace containing P uniformly distributed subbands. This interlace subband structure provides several advantages. First, frequency diversity is achieved since each interlace contains subbands taken from across the entire system bandwidth. Second, a receiving entity may recover data/pilot symbols sent on a given interlace by performing a partial P-point FFT instead of a full N-point FFT, which can simplify the processing at the receiving entity.

A communication channel between transmitting entity 110 and receiving entity 150 in OFDM system 100 may be characterized by either a time-domain channel impulse response or a corresponding frequency-domain channel frequency response. As used herein, and which is consistent with conventional terminology, a "channel impulse response" or "impulse response" is a time-domain response of the channel, and a "channel frequency response" or "frequency response" is a frequency-domain response of the channel. In a sampled-data system, the channel frequency response is the discrete Fourier transform (DFT) of the channel impulse response. This relationship may be expressed in matrix form, as follows:

$$\underline{H}_{N\times 1} = \underline{W}_{N\times N} \cdot \underline{h}_{N\times 1} \text{ and } \underline{h}_{N\times 1} = \underline{W}_{N\times N}^H \cdot \underline{H}_{N\times 1}, \qquad \text{Eq (2)}$$

where $\underline{h}_{N\times 1}$ is an N×1 vector for the impulse response of the communication channel;

$\underline{H}_{N\times 1}$ is an N×1 vector for the frequency response of the communication channel;

$\underline{W}_{N\times N}$ is an N×N Fourier matrix; and

"H" denotes a conjugate transpose.

The Fourier matrix $\underline{W}_{N\times N}$ is defined such that the (l,n)-th entry, $W_N^{l,n}$, is given as:

$$W_N^{l,n} = e^{-j2\pi \frac{(l-1)(n-1)}{N}}, \text{ for } l = 1 \ldots N \text{ and } n = 1 \ldots N \qquad \text{Eq (3)}$$

where l is a row index and n is a column index.

The channel impulse response $\underline{h}_{N\times 1}$ is composed of N channel taps, with each channel tap $h_l$ being defined by a zero or non-zero complex gain value at a specific tap delay l. The channel frequency response $\underline{H}_{N\times 1}$ is composed of N channel gains for the N total subbands, with each channel gain $H_k$ being a complex gain value for a specific subband k.

If pilot symbols are transmitted on the P subbands in interlace m, then the received pilot symbols for this interlace may be expressed as:

$$\underline{Y}_m = \underline{H}_m \circ \underline{X}_m + \underline{N}_m, \qquad \text{Eq (4)}$$

where $\underline{X}_m$ is a P×1 vector with P pilot symbols sent on the P subbands in interlace m;

$\underline{Y}_m$ is a P×1 vector with P received pilot symbols obtained by the receiving entity for the P subbands in interlace m;

$\underline{H}_m$ is a P×1 vector for the actual channel frequency response for interlace m;

$\underline{N}_m$ is a P×1 noise vector for the P subbands in interlace m; and

"∘" denotes the Hadamard product, which is an element-wise product, where the i-th element of $\underline{Y}_m$ is the product of the i-th elements of $\underline{X}_m$ and $\underline{H}_m$.

The vector $\underline{H}_m$ contains only P entries of the vector $\underline{H}_{N\times 1}$ for the P subbands in interlace m. For simplicity, the noise $\underline{N}_m$ is assumed to be additive white Gaussian noise (AWGN) with zero mean and a variance of $\sigma^2$.

An initial frequency response estimate may be obtained for interlace m, as follows:

$$\underline{\hat{H}}_m = \underline{Y}_m / \underline{X}_m = \underline{H}_m + \underline{N}_m / \underline{X}_m, \qquad \text{Eq (5)}$$

where $\underline{Y}_m / \underline{X}_m = [y_{m,1}/p_{m,1} \ldots y_{m,P}/p_{m,P}]$, and $y_{m,i}$ and $p_{m,i}$ are respectively the received and transmitted pilot symbols for the i-th subband in interlace m; and $\underline{\hat{H}}_m$ is a P×1 vector for the initial frequency response estimate for interlace m.

$\underline{\hat{H}}_m$ contains P channel gain estimates for the P subbands in interlace m, which may be obtained based on P element-wise ratios of the received pilot symbols to the transmitted pilot symbols, as shown in equation (5). If interlace m contains unused subbands with no received pilot symbols, then extrapolation, interpolation, and/or some other technique may be used to estimate the channel gains for these unused subbands.

A P-tap impulse response estimate using interlace m may be obtained by performing a P-point IFFT on the initial frequency response estimate $\underline{\hat{H}}_m$, as follows:

$$\underline{\tilde{h}}_m = \underline{W}_m \cdot \underline{W}_{P\times P}^H \cdot \underline{\hat{H}}_m, \qquad \text{Eq (6)}$$

where $\underline{\tilde{h}}_m$ is a P×1 vector for the impulse response estimate for interlace m;

$\underline{W}_{P\times P}$ is a P×P Fourier matrix with elements defined as shown in equation (3); and $\underline{W}_{P\times P}$ is a P×P diagonal matrix containing $W_N^{-m,p}$ for the p-th diagonal element, for p=1 ... P, and zeros elsewhere, where $$W_N^{-m,p} = e^{j2\pi \frac{(m-1)(p-1)}{N}}.$$

The channel component in the P elements of vector $\underline{W}_{P\times P}^H \cdot \underline{\hat{H}}_m$ contains a phase ramp which may be expressed as: $\overline{h}_{m,p} = h_p \cdot W_N^{m,p}$, for p=1 ... P. The slope of the phase ramp is determined by the staggering phase m of interlace m. The phase ramp may be removed by multiplying each element of $\underline{W}_{P\times P}^H \cdot \underline{\hat{H}}_m$ with $W_N^{-m,p}$ to obtain a corresponding element of $\overline{h}_m$. The P elements of $\overline{h}_m$ may be expressed as: $h_p = h_{m,p} \cdot \overline{W}_N^{-m,p}$, for p=1 ... P.

$\underline{\tilde{h}}_m$ contains P channel taps and is obtained based on $\underline{\hat{H}}_m$, which contains P channel gain estimates for the P subbands in interlace m. Since the actual channel impulse response $\underline{h}_{N\times 1}$ is composed of N channel taps, the initial impulse response estimate $\underline{\tilde{h}}_m$ is undersampled in the frequency domain by the P subbands in interlace m. This undersampling in the frequency domain causes aliasing of the channel impulse response $\underline{h}_{N\times 1}$ in the time domain. The initial impulse response estimate $\underline{\tilde{h}}_m$ may be expressed as:

$$\underline{\tilde{h}}_m = \sum_{s=1}^{M} \underline{h}_s \cdot W_M^{s,m} + \underline{n}, \qquad \text{Eq (7)}$$

where $\underline{h}_{N\times 1} = [\underline{h}_1^T \underline{h}_2^T \ldots \underline{h}_M^T]^T$ is the full-length actual channel impulse response;

$\underline{h}_s$, for s=1 ... M, is a P×1 vector containing P channel taps in $\underline{h}_{N\times 1}$ with tap indices of (s−1)·P+1 through s·P;

$\underline{n}$ is a P×1 vector of noise for the initial impulse response estimate $\underline{\tilde{h}}_m$;

$$W_M^{s,m} = e^{-j2\pi \frac{(s-1)(m-1)}{M}}; \text{ and}$$

"T" denotes a transpose.

An "aliasing pattern" corresponding to staggering phase m may be defined as $\{W_M^{s,m}\}$, for s=1 ... M, and include the coefficients used for equation (7). The full-length actual channel impulse response $\underline{h}_{N\times 1}$ is composed of M segments. Each segment s contains P consecutive channel taps in $\underline{h}_{N\times 1}$ and is represented by a vector $\underline{\hat{h}}_s$. Equation (7) indicates that the M segments alias and combine when undersampled in the frequency domain, and the combining coefficients are given by the aliasing pattern.

Figure 3:
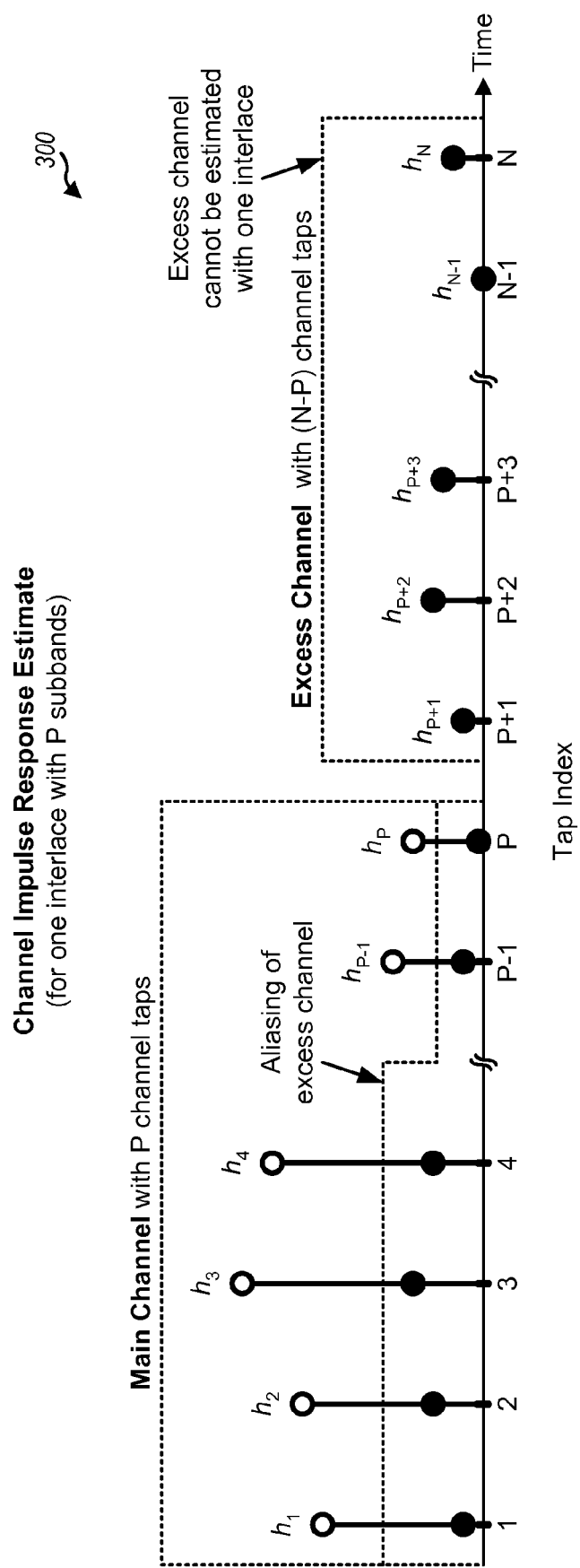
FIG. 3 shows an impulse response estimate for one interlace.

FIG. 3 shows an impulse response estimate 300 obtained based on pilot symbols received on P subbands in one interlace. The full-length channel impulse response $h_{N\times 1}$ is composed of N channel taps with indices of 1 through N. The first P channel taps in $h_{N\times 1}$ are contained in $h_1$ and may be referred to as the main channel. The remaining N–P channel taps in $h_{N\times 1}$ are contained in $h_2$ through $h_M$ and may be referred to as the excess channel. The excess channel taps alias when undersampled in the frequency domain. The aliasing results in the excess channel taps at indices of P+l, 2P+l, ..., and (M–1)·P+l all appearing at tap index l, for l=1 ... P. The P channel taps in $\hat{h}_m$ thus contain P main channel taps as well as N–P excess channel taps. Each aliased excess channel tap causes error in the estimation of the corresponding main channel tap.

A longer impulse response estimate with more than P channel taps may be obtained by transmitting pilot symbols on multiple interlaces. One interlace may be used for pilot transmission in each symbol period, and different interlaces may be used for pilot transmission in different symbol periods. The use of multiple interlaces for pilot transmission allows the receiving entity to obtain a longer channel estimate, which may improve performance. By using all M interlaces for pilot transmission, it is possible to estimate the entire full-length channel impulse response with N channel taps.

The specific interlace to use for pilot transmission in each OFDM symbol period may be determined by a pilot staggering pattern. Various staggering patterns may be used for pilot transmission. In an embodiment, a staggering pattern may select one interlace for pilot transmission in each symbol period based on the following:

$$m_t = [(m_{t-1} - 1 + \Delta m) \bmod M] + 1, \text{ with } (\Delta m, M) = 1, \quad \text{Eq (8)}$$

where t is an index for symbol period;

$\Delta m$ is the difference between interlace indices for two consecutive symbol periods;

$m_t$ is the interlace to use for pilot transmission in symbol period t; and $(x, y) = 1$ means that x and y are relatively prime (i.e., the greatest common divisor for both x and y is one).

The –1 and +1 in equation (8) account for an interlace index numbering scheme that starts with '1' instead of '0'. The interlace used for the first symbol period is $m_1$, where $m_1 \in \{1 \ldots M\}$. Different "complete" staggering patterns may be formed with different values of $\Delta m$. A complete staggering pattern is one that selects all M interlaces for pilot transmission, e.g., in M symbol periods. As an example, with $\Delta m=1$, the M interlaces are selected in sequential order, and the staggering pattern may be expressed as $\{1, 2, 3, \ldots, M\}$. For the case with M=8, values of 1, 3, 5, and 7 may be used for $\Delta m$ to obtain different complete staggering patterns. Of these four values, 7 is equivalent to 1 (in terms of performance) since $\Delta m=1$ is an increment of one and $\Delta m=7$ is a decrement of one, and 5 is equivalent to 3 for the same reason.

Figure 4A:
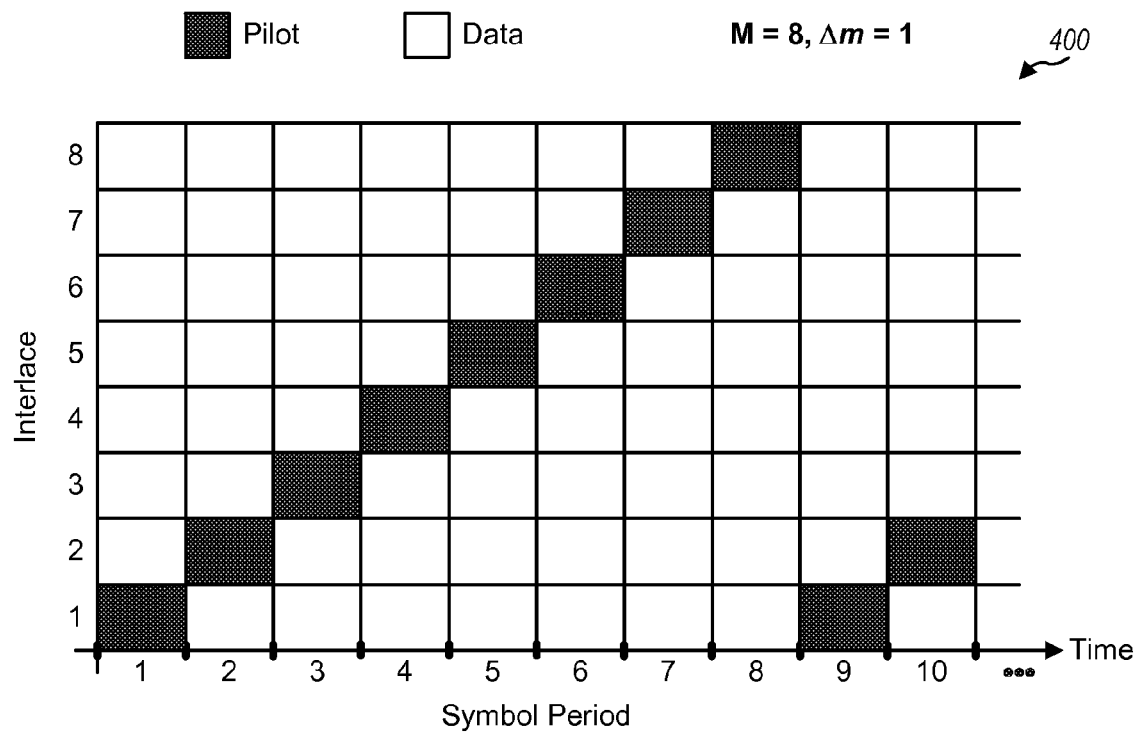
FIGS. 4A through 4C show three different pilot staggering patterns.

FIG. 4A shows a complete staggering pattern 400 that may be used for pilot transmission. The vertical axis represents interlace indices, and the horizontal axis represents time. For this example, M=8 and one interlace is used for pilot transmission in each symbol period. Staggering pattern 400 is generated with $\Delta m=1$ in equation (8), and the complete staggering pattern may be expressed as $\{1, 2, 3, 4, 5, 6, 7, 8\}$. The pilot is thus transmitted on interlace 1 in symbol period 1, then interlace 2 in symbol period 2, and so on, then interlace 8 in symbol period 8, then back to interlace 1 in symbol period 9, and so on. All eight interlaces are used for pilot transmission in each 8-symbol period duration.

Figure 4B:
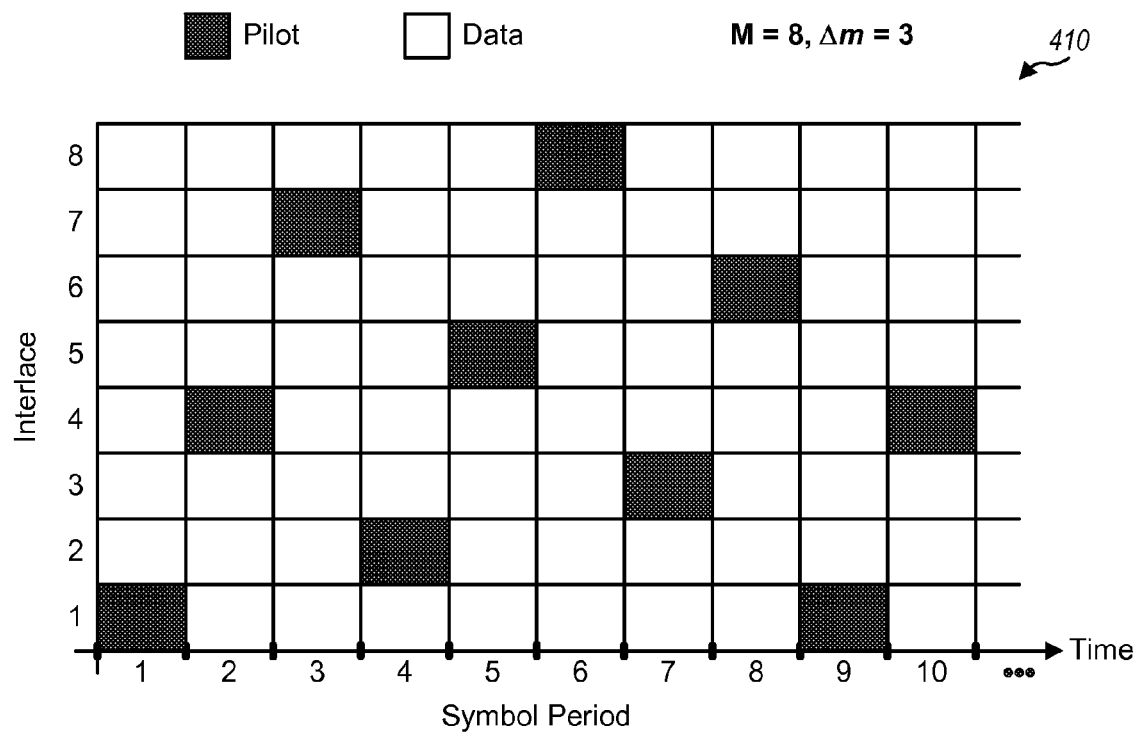

FIG. 4B shows a complete staggering pattern 410 that may also be used for pilot transmission. Again, M=8 and one interlace is used for pilot transmission in each symbol period. Staggering pattern 410 is generated with $\Delta m=3$ in equation (8), and the complete staggering pattern may be expressed as $\{1, 4, 7, 2, 5, 8, 3, 6\}$. The pilot is thus sent on interlace 1 in symbol period 1, then interlace 4 in symbol period 2, then interlace 7 in symbol period 3, and so on. Again, the pilot is transmitted on all eight interlaces in each 8-symbol period duration. Over three symbol periods, staggering pattern 410 selects interlaces with relative offsets of $\{1, 4, 7\}$ while staggering pattern 400 selects interlaces with relative offsets of $\{1, 2, 3\}$. Staggering pattern 410 is thus more "spread out" than staggering pattern 400 and may provide better performance.

Figure 4C:
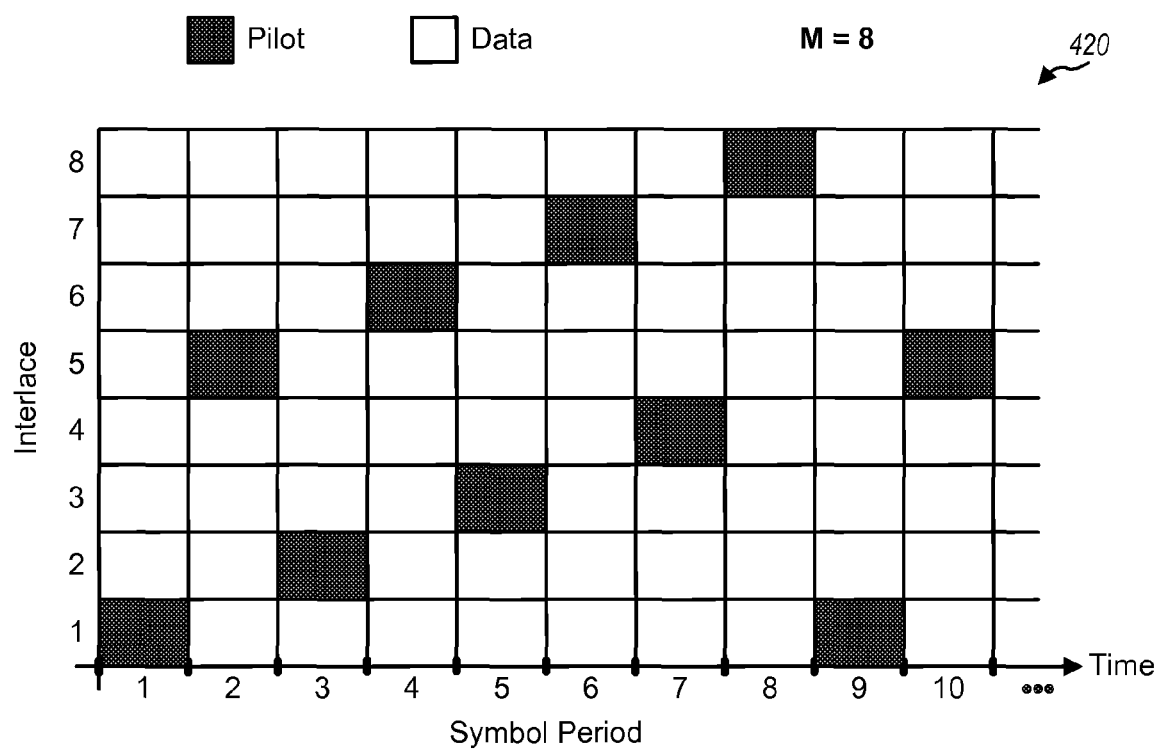

FIG. 4C shows a complete staggering pattern 420 that does not satisfy equation (8) but may also be used for pilot transmission. This complete staggering pattern may be expressed as $\{1, 5, 2, 6, 3, 7, 4, 8\}$. The pilot is transmitted on all eight interlaces in each 8-symbol period duration.

In general, the pilot may be transmitted on any number of interlaces and on any one of the M interlaces in each symbol period. The particular interlace to use for pilot transmission in each symbol period may be selected based on any staggering pattern, three of which are shown in FIGS. 4A through 4C. The pilot may be transmitted on all M interlaces using a complete staggering pattern or on a subset of the M interlaces using a "partial" staggering pattern.

A longer impulse response estimate $\tilde{\underline{h}}_{L\times 1}(t)$ with L channel taps, where $P < L \leq N$, may be obtained by filtering multiple P-tap initial impulse response estimates obtained for multiple interlaces. This time-domain filtering may be performed, e.g., with a finite impulse response (FIR) filter, as follows:

$$\tilde{h}_{s,l}(t) = \sum_{i=-N_f}^{N_b-1} \alpha_{s,l}(i) \cdot \hat{h}_l(t-i), \quad \text{Eq (9)}$$

for $l = 1 \ldots P$ and $s = 1 \ldots S$, where $\underline{\hat{h}}(t) = [\hat{h}_1(t) \hat{h}_2(t) \ldots \hat{h}_P(t)]^T$ is an initial impulse response estimate obtained for symbol period t based on a pilot received on interlace $m_t$;

$\underline{\tilde{h}}_s(t) = [\tilde{h}_{s,1}(t) \tilde{h}_{s,2}(t) \ldots \tilde{h}_{s,P}(t)]$ is a P×1 vector that is an estimate of the channel impulse response $\underline{h}_s(t)$ for segment s in symbol period t;

$\alpha_{s,l}(i)$ is a coefficient for the i-th filter tap used to derive the l-th channel tap in segment s;

$N_f$ is the number of non-causal taps for the time-domain filter; and $N_b$ is the number of causal taps for the time-domain filter. The L-tap impulse response estimate $\underline{\tilde{h}}_{L\times 1}(t)$ is composed of S segments and may be given as: $\underline{\tilde{h}}_{L\times 1}(t) = [\underline{\tilde{h}}_1^T(t) \underline{\tilde{h}}_2^T(t) \ldots \underline{\tilde{h}}_S^T(t)]^T$, where $S > 1$ and $L = S \cdot P$. Each segment s, for $s = 1 \ldots S$, contains P channel taps that are included in the vector $\underline{\tilde{h}}_s(t)$. $\underline{\tilde{h}}_s(t)$ is an estimate of $\underline{h}_s(t)$, which is the actual channel impulse response for segment s.

Equation (9) indicates that the P channel taps for each segment s may be obtained by filtering $N_f + N_b$ initial impulse response estimates $\underline{\hat{h}}(t + N_f)$ through $\underline{\hat{h}}(t - N_b + 1)$, which may be obtained over $N_f + N_b$ symbol periods for $N_f + N_b$ different interlaces. The initial impulse response estimate $\underline{\hat{h}}(t)$ for the current symbol period t is aligned at filter tap i=0. Equation (9) also indicates that each channel tap $\tilde{h}_{s,t}(t)$ in $\underline{\tilde{h}}_{L\times 1}(t)$ may be obtained by multiplying $N_f+N_b$ channel taps $\hat{h}_t(t-N_b+1)$ through $\hat{h}_t(t+N_f)$ with $N_f+N_b$ coefficients $\alpha_{s,t}(N_b-1)$ through $\alpha_{s,t}(-N_f)$, respectively, and combining the $N_f+N_b$ resultant products.

In general, the coefficients for each channel tap $\tilde{h}_{s,t}(t)$ of each segment s may be selected separately. Furthermore, $N_f$ and $N_b$ may be selected for each channel tap of each segment s. For simplicity, one set of $N_f+N_b$ coefficients may be used for all P channel taps in each segment, and S sets of coefficients may be defined for the S segments of $\underline{\tilde{h}}_{L\times 1}(t)$ In this case, the coefficients $\{\alpha_s(i)\}$ for each segment s are not a function of channel tap index.

The time-domain filtering may also be performed using other types of filter, such as an infinite impulse response (IIR) filter. The time-domain filtering may also be performed using a causal filter (with $N_f=0$ and $N_b\geq 1$), a non-causal filter (with $N_f\geq 1$), or a filter with both causal and non-causal taps. For clarity, the following description is for the time-domain filter shown in equation (9).

1. Channel Impulse Response Estimate of Length 2P

To obtain a longer impulse response estimate $\underline{\tilde{h}}_{2P\times 1}(t)$ with L=2P channel taps, the initial impulse response estimate $\underline{\hat{h}}(t)$ obtained in symbol period t for one interlace may be expressed as:

$$\underline{\hat{h}}(t)=\underline{h}_1(t)+\underline{h}_2(t)\cdot W_M^{m_t}+\underline{n}(t), \qquad \text{Eq (10)}$$

where $$W_M^{m_t} = e^{-j2\pi\frac{(m_t-1)}{M}}.$$

Equation (10) is derived based on equation (7) and assumes that segments 3 through M contain channel taps with zero magnitude. The vector $\underline{h}_1(t)$ contains the first P channel taps in $\underline{h}_{N\times 1}(t)$ for the main channel. The vector $\underline{h}_2(t)$ contains the next P channel taps in $\underline{h}_{N\times 1}(t)$ for the excess channel.

The coefficients for the time-domain filter for the main channel estimate $\underline{\tilde{h}}_1(t)$ may be selected based on various constraints such as:

Cancel excess channel:

$$\sum_{i=-N_f}^{N_b-1} \alpha_1(i)\cdot W_M^{m_t-i} = 0, \qquad \text{Eq (11a)}$$

Suppress time variation:

$$\sum_{i=-N_f}^{N_b-1} \alpha_1(i)\cdot i = 0, \qquad \text{Eq (11b)}$$

Provide unbiased estimate:

$$\sum_{i=-N_f}^{N_b-1} \alpha_1(i) = 1, \qquad \text{Eq (11c)}$$

and
Minimize noise variance:

$$\min\left(\sum_{i=-N_f}^{N_b-1} \alpha_1^2(i)\right), \qquad \text{Eq (11d)}$$

where $m_{t-i}$ is the interlace used for pilot transmission in symbol period t−i, which corresponds to the i-th filter tap. An unbiased estimate is one for which the mean of the estimate (over noise) is equal to the perfect channel value.

Equation (11b) cancels the linear component of the channel variation over the $N_f+N_b$ symbol periods, which would be the dominant component at low speeds and/or small $N_f+N_b$. The first constraint in equation (11a) cancels the contribution from the excess channel $\underline{h}_2(t)$, so that $\underline{\tilde{h}}_1(t)$ contains mostly components from the main channel $\underline{h}_{1,t}(t)$. The second constraint in equation (11b) suppresses time variation in the main channel $\underline{h}_1(t)$ across the $N_f+N_b$ symbol periods. The third constraint in equation (11c) provides an unbiased estimate of $\underline{h}_1(t)$, so that the expected magnitude of $\underline{\tilde{h}}_{1,t}(t)$ is equal to $\underline{h}_{1,t}(t)$. The fourth constraint in equation (11d) minimizes the noise variance in the main channel estimate $\underline{\tilde{h}}_1(t)$. The number of taps ($N_f+N_b$) for the time-domain filter determines (1) the number of degrees of freedom for selecting the coefficients and (2) the number of constraints that may be applied in selecting the coefficients.

The coefficients for the time-domain filter for the excess channel $\underline{\tilde{h}}_2(t)$ may be selected based on the various constraints such as:

Cancel main channel:

$$\sum_{i=-N_f}^{N_b-1} \alpha_2(i) = 0, \qquad \text{Eq (12a)}$$

Suppress time variation of main channel:

$$\sum_{i=-N_f}^{N_b-1} \alpha_2(i)\cdot i = 0, \qquad \text{Eq (12b)}$$

Suppress time variation of excess channel:

$$\sum_{i=-N_f}^{N_b-1} \alpha_2(i)\cdot i W_M^{m_t-i} = 0, \qquad \text{Eq (12c)}$$

and
Provide unbiased estimate:

$$\sum_{i=-N_f}^{N_b-1} \alpha_2(i)\cdot W_M^{m_t-i} = 1. \qquad \text{Eq (12d)}$$

The first constraint in equation (12a) cancels the contribution from the main channel $\underline{h}_1(t)$, so that $\underline{\tilde{h}}_2(t)$ contains mostly components from the excess channel $\underline{h}_2(t)$. The second constraint in equation (12b) suppresses time variation in the main channel $\underline{h}_1(t)$. The third constraint in equation (12c) provides an unbiased estimate of $\underline{h}_2(t)$.

As a specific example, a 3-tap time-domain filter may be used to derive the 2P channel taps in $\tilde{h}_{2P\times 1}(t)$ based on $\hat{h}(t-1)$, $\hat{h}(t)$, and $\hat{h}(t+1)$ for three symbol periods. The 3-tap time-filter may be designed as follows. Using equation (10), the l-th channel tap in symbol periods $t-1$, $t$, and $t+1$, prior to the time-domain filtering, may be expressed as:

$$\hat{h}_l(t-1) = h_{1,l}(t-1) + h_{2,l}(t-1) \cdot W_M^{m_{t-1}} + n_l(t-1),$$

$$\hat{h}_l(t) = h_{1,l}(t) + h_{2,l}(t) \cdot W_M^{m_{t-1}} + n_l(t), \text{ for } l=1 \ldots P,$$

$$\hat{h}_l(t-1) = h_{1,l}(t-1) + h_{2,l}(t-1) \cdot W_M^{m_{t-1}} + n_l(t-1), \quad \text{Eq (13)}$$

where $\hat{h}_l(t)$, $h_{1,l}(t)$, $h_{2,l}(t)$, and $n_l(t)$ are the l-th element of $\hat{h}(t)$, $h_1(t)$, $h_2(t)$, and $n(t)$, respectively; and $m_{t-1}$, $m_t$, and $m_{t+1}$ are the interlaces used for pilot transmission in symbol periods $t-1$, $t$, and $t+1$, respectively.

For the 3-tap time-domain filter for staggering pattern 410 shown in FIG. 4B, with $M=8$, $m_{t-1}=m_t-3$, and $m_{t+1}=m_t+3$, the constraints used to select the coefficients for the main channel estimate $\tilde{h}_1(t)$ may be expressed as:

| | |
|---|---|
| Cancel excess channel: | $\alpha_1(-1) \cdot e^{-j3\pi/4} + \alpha_1(0) + \alpha_1(1) \cdot e^{j3\pi/4} = 0$, |
| Suppress time variation: | $\alpha_1(-1) - \alpha_1(1) = 0$, and |
| Provide unbiased estimate: | $\alpha_1(-1) + \alpha_1(0) + \alpha_1(1) = 1$. |

The first equation above (to cancel the excess channel) is from equation (11a) and has the form: $\alpha_1(-1) \cdot W_8^{m_t+3} + \alpha_1(0) \cdot W_8^{m_t} + \alpha_1(1) \cdot W_8^{m_t-3} = 0$, which may be simplified as: $\alpha_1(-1) \cdot W_8^3 + \alpha_1(0) + \alpha_1(1) \cdot W_8^{-3} = 0$, where $W_8^3 = e^{-j3\pi/4}$ and $W_8^{-3} = e^{+j3\pi/4}$.

The solution to the above set of equations for the main channel is given as:

$$\begin{bmatrix} \alpha_1(-1) \\ \alpha_1(0) \\ \alpha_1(1) \end{bmatrix} = \begin{bmatrix} 1 - 1/\sqrt{2} \\ \sqrt{2} - 1 \\ 1 - 1/\sqrt{2} \end{bmatrix}. \quad \text{Eq (14)}$$

Equation (14) indicates that the coefficients for the main channel estimate $\tilde{h}_1(t)$ are independent of symbol period t. This set of coefficients suppresses time variation in the main channel $h_1(t)$ but does not suppress time-variation in the excess channel $h_2(t)$. Time-variation error is proportional to the energy of the channel taps, which is typically small for the excess channel and significant only when the transmitting and/or receiving entity is moving at high speeds. Thus, not suppressing time variation in the excess channel $h_2(t)$ may only marginally degrade performance, if at all.

For the 3-tap time-domain filter for staggering pattern 410 shown in FIG. 4B, the constraints used to select the coefficients for the excess channel estimate $\tilde{h}_2(t)$ may be expressed as:

| | |
|---|---|
| Cancel main channel: | $\alpha_2(-1) + \alpha_2(0) + \alpha_2(1) = 0$, |
| Suppress time variation: | $\alpha_2(-1) - \alpha_2(1) = 0$, and |
| Provide unbiased estimate: | $\alpha_2(-1) \cdot e^{-j3\pi/4} + \alpha_2(0) + \alpha_2(1) \cdot e^{j3\pi/4} = e^{j2\pi \cdot (m_t-1)/8}$. |

The third equation above (to provide an unbiased estimate) is from equation (12c) and has the form: $\alpha_2(-1) \cdot W_8^{m_t+3} + \alpha_2(0) \cdot W_8^{m_t} + \alpha_2(1) \cdot W_8^{m_t-3} = 1$, which may be simplified as: $\alpha_1(-1) \cdot W_8^3 + \alpha_1(0) + \alpha_1(1) \cdot W_8^{-3} = W_8^{m_t}$, where $m_t \in \{1 \ldots M\}$.

The solution to the above set of equations for the excess channel is given by:

$$\begin{bmatrix} \alpha_2(-1) \\ \alpha_2(0) \\ \alpha_2(1) \end{bmatrix} = \begin{bmatrix} -1 + 1/\sqrt{2} \\ 2 - \sqrt{2} \\ -1 + 1/\sqrt{2} \end{bmatrix} \cdot e^{j2\pi \cdot (m_t-1)/8}. \quad \text{Eq (15)}$$

Equation (15) indicates that the coefficients for the excess channel are dependent on the staggering phase $m_t$ of interlace $m_t$ used for pilot transmission in symbol period t.

2. Channel Impulse Response Estimate of Length 3P

To obtain a longer impulse response estimate $\tilde{h}_{3P\times 1}(t)$ with $L=3P$ channel taps, the initial impulse response estimate $\hat{h}(t)$ obtained in symbol period t for one interlace may be expressed as:

$$\hat{h}(t) = \underline{h}_1(t) + \underline{h}_2(t) \cdot W_M^{m_t} + \underline{h}_3(t) \cdot W_M^{2m_t} + \underline{n}(t), \quad \text{Eq (16)}$$

Equation (16) is derived based on equation (7) and assumes that segments 4 through M contain channel taps with zero magnitude. The vectors $\underline{h}_1(t)$, $\underline{h}_2(t)$, and $\underline{h}_3(t)$ contain P channel taps for the first, second, and third segments, respectively, of $h_{N\times 1}(t)$.

A 3-tap time-domain filter may also be used to derive the 3P elements of $\tilde{h}_{3P\times 1}(t)$ based on $\hat{h}(t-1)$, $\hat{h}(t)$, and $\hat{h}(t+1)$ obtained in three symbol periods. Using equation (16), the l-th channel tap in symbol periods $t-1$, $t$, and $t+1$, prior to the time-domain filtering, may be expressed in matrix form, as follows:

$$\begin{bmatrix} \hat{h}_l(t-1) \\ \hat{h}_l(t) \\ \hat{h}_l(t+1) \end{bmatrix} = \begin{bmatrix} 1 & W_M^{-\Delta m} & W_M^{-2\Delta m} \\ 1 & 1 & 1 \\ 1 & W_M^{\Delta m} & W_M^{2\Delta m} \end{bmatrix} \cdot \begin{bmatrix} h_{1,l}(t) \\ h_{2,l}(t) \cdot W_M^{m_t} \\ h_{3,l}(t) \cdot W_M^{2m_t} \end{bmatrix} + \begin{bmatrix} n_l(t-1) \\ n_l(t) \\ n_l(t+1) \end{bmatrix}, \quad \text{Eq (17)}$$

for $l = 1 \ldots P$, where $$W_M^{\Delta m} = e^{-j2\pi \frac{\Delta m}{M}}.$$

Equation (17) assumes that $m_{t-1} = m_t - \Delta m$ and $m_{t+1} = m_t + \Delta m$. The 3-tap time-domain filter does not have enough degrees of freedom to suppress time variation in $\underline{h}_1(t)$, $\underline{h}_2(t)$, or $\underline{h}_3(t)$. Thus, equation (17) further assumes that $\underline{h}_1(t)$, $\underline{h}_2(t)$, and $\underline{h}_3(t)$ are constant over the three symbol periods $t-1$, $t$, and $t+1$.

A least-squares estimate of $\underline{h}_1(t)$, $\underline{h}_2(t)$, and $\underline{h}_3(t)$ may be obtained as follows:

$$\begin{bmatrix} h_{1,l}(t) \\ h_{2,l}(t) \cdot W_M^{m_t} \\ h_{3,l}(t) \cdot W_M^{2m_t} \end{bmatrix} = \begin{bmatrix} 1 & W_M^{-\Delta m} & W_M^{-2\Delta m} \\ 1 & 1 & 1 \\ 1 & W_M^{\Delta m} & W_M^{2\Delta m} \end{bmatrix}^{-1} \cdot \begin{bmatrix} \hat{h}_l(t-1) \\ \hat{h}_l(t) \\ \hat{h}_l(t+1) \end{bmatrix}, \quad \text{Eq (18)}$$

for $l = 1 \ldots P$.

The 3-tap time-domain filter for $\underline{h}_1(t)$, $\underline{h}_2(t)$, and $\underline{h}_3(t)$ may be expressed in matrix form, as follows:

$$\begin{bmatrix} \tilde{h}_{1,l}(t) \\ \tilde{h}_{2,l}(t) \\ \tilde{h}_{3,l}(t) \end{bmatrix} = \begin{bmatrix} \alpha_1(1) & \alpha_1(0) & \alpha_1(-1) \\ \alpha_2(1) & \alpha_2(0) & \alpha_2(-1) \\ \alpha_3(1) & \alpha_3(0) & \alpha_3(-1) \end{bmatrix} \cdot \begin{bmatrix} \hat{h}_l(t-1) \\ \hat{h}_l(t) \\ \hat{h}_l(t+1) \end{bmatrix}, \quad \text{Eq (19)}$$

for $l = 1 \ldots P$.

For staggering pattern 410 shown in FIG. 4B, with M=8 and $\Delta m$=3, the coefficients for the 3-tap time-domain filter may be derived based on equation (18) and given as:

$$\begin{bmatrix} \alpha_1(1) \\ \alpha_1(0) \\ \alpha_1(-1) \end{bmatrix} = \begin{bmatrix} 0.3536 - j0.1464 \\ 0.2929 \\ 0.3536 + j0.1464 \end{bmatrix},$$

$$\begin{bmatrix} \alpha_2(1) \\ \alpha_2(0) \\ \alpha_2(-1) \end{bmatrix} = \begin{bmatrix} (-0.2071 - j0.2071) \cdot e^{j\frac{\pi}{4}m_t} \\ 0.4142 \cdot e^{j\frac{\pi}{4}m_t} \\ (-0.2071 + j0.2071) \cdot e^{j\frac{\pi}{4}m_t} \end{bmatrix},$$

and $$\begin{bmatrix} \alpha_3(1) \\ \alpha_3(0) \\ \alpha_3(-1) \end{bmatrix} = \begin{bmatrix} (-0.1464 + j0.3536) \cdot e^{j\frac{\pi}{2}m_t} \\ 0.2929 \cdot e^{j\frac{\pi}{2}m_t} \\ (-0.1464 - j0.3536) \cdot e^{j\frac{\pi}{2}m_t} \end{bmatrix}.$$

The main channel estimate $\tilde{h}_1(t)$ may be obtained by applying the coefficients $\alpha_1(1)$, $\alpha_1(0)$, and $\alpha_1(-1)$ to $\hat{h}(t-1)$, $\hat{h}(t)$, and $\hat{h}(t+1)$, respectively. The excess channel estimate $\tilde{h}_2(t)$ may be obtained by applying the coefficients $\alpha_2(1)$, $\alpha_2(0)$, and $\alpha_2(-1)$ to $\hat{h}(t-1)$, $\hat{h}(t)$, and $\hat{h}(t+1)$, respectively. The excess channel estimate $\tilde{h}_3(t)$ may be obtained by applying the coefficients $\alpha_3(1)$, $\alpha_3(0)$, and $\alpha_3(-1)$ to $\hat{h}(t-1)$, $\hat{h}(t)$, and $\hat{h}(t+1)$, respectively.

The 3-tap time-domain filter does not have sufficient degrees of freedom to apply many of the constraints shown in equation sets (11) and (12). The coefficients for this time-domain filter do not suppress time variation in the main channel $\underline{h}_1(t)$ or the excess channel $hh_2(t)$ and $\underline{h}_3(t)$. The various constraints described above may be applied by using a time-domain filter with more than three taps.

In general, a different set of coefficients $\{\alpha_s(i)\}$ may be derived for the time-domain filter for the impulse response estimate $\tilde{hh}_s(t)$ for each segment s. The coefficients for each segment s may be selected based on various constraints such as: canceling the other segments, suppressing estimation error due to time variation in the channel, providing an unbiased estimate of $\underline{h}_s(t)$, minimizing the noise variance in $\tilde{h}_s(t)$, and so on. The number of taps for the time-domain filter determines the number of constraints that may be applied to the coefficients. Several exemplary 3-tap time-domain filter designs have been described above. Other time-domain filters may also be designed based on the description above and are within the scope of the invention.

In general, a longer impulse response estimate with L channel taps may be obtained based on pilot symbols received on L different subbands in one or more symbol periods. The pilot may be transmitted on one interlace in each symbol period to limit the amount of overhead for the pilot. The pilot may be transmitted on different interlaces with staggered subbands in different symbol periods. This allows the receiving entity to obtain a longer impulse response estimate with more than P channel taps. A full-length impulse response estimate with all N channel taps may be obtained if the pilot is transmitted on all M interlaces using a complete staggering pattern.

The receiving entity may derive a longer impulse response estimate $\tilde{h}_{L \times 1}(t)$ of length L by filtering initial impulse response estimates $\hat{h}$ of length P for a sufficient number of (S or more) different interlaces. If the pilot is transmitted on a different interlace in each symbol period, then the time-domain filtering may be performed over a sufficient number of (S or more) symbol periods to obtain $\tilde{h}_{L \times 1}(t)$. A progressively longer impulse response estimate may be obtained by filtering over more symbol periods. Time-domain filtering over fewer symbol periods provides better tracking of changes in the channel, is thus more robust to Doppler effects, and can provide an impulse response estimate with a shorter length. Time-domain filtering over more symbol periods increases error in $\tilde{h}_{L \times 1}(t)$ due to changes in the channel over time, is less robust to Doppler effects, but can provide an impulse response estimate with a longer length.

A longer impulse response estimate contains excess channel taps. Since each channel tap contains the complex channel gain at that tap position as well as noise, a progressively longer impulse response estimate contains more information regarding the channel but also contains more noise. The noise from the excess channel taps may be viewed as noise enhancement resulting from extending the length of the channel estimate beyond P. If the excess channel energy is relatively small, or if the excess channel taps are not needed, then better performance may be achieved with a shorter impulse response estimate (e.g., $\tilde{h}_{2P \times 1}(t)$). If the excess channel energy is relatively large, or if the excess channel taps are pertinent, then a longer impulse response estimate (e.g., $\tilde{h}_{3P \times 1}(t)$) may provide better performance even with the noise enhancement. Channel estimates with different lengths may be derived and used for different purposes at the receiving entity.

3. Data Detection

For data detection, a longer impulse response estimate $\tilde{h}_{2P \times 1}(t)$ with 2P channel taps may provide a good trade-off between a longer channel estimate and additional noise from the excess channel. The longer channel estimate mitigates the deleterious aliasing effect shown in equation (7) due to undersampling the frequency domain, provides a more accurate estimate of the main channel $\underline{h}_1(t)$, and allows for estimation of the excess channel $\underline{h}_2(t)$. The longer impulse response estimate $\tilde{h}_{2P \times 1}(t)$ may be derived as described above.

Figure 5:
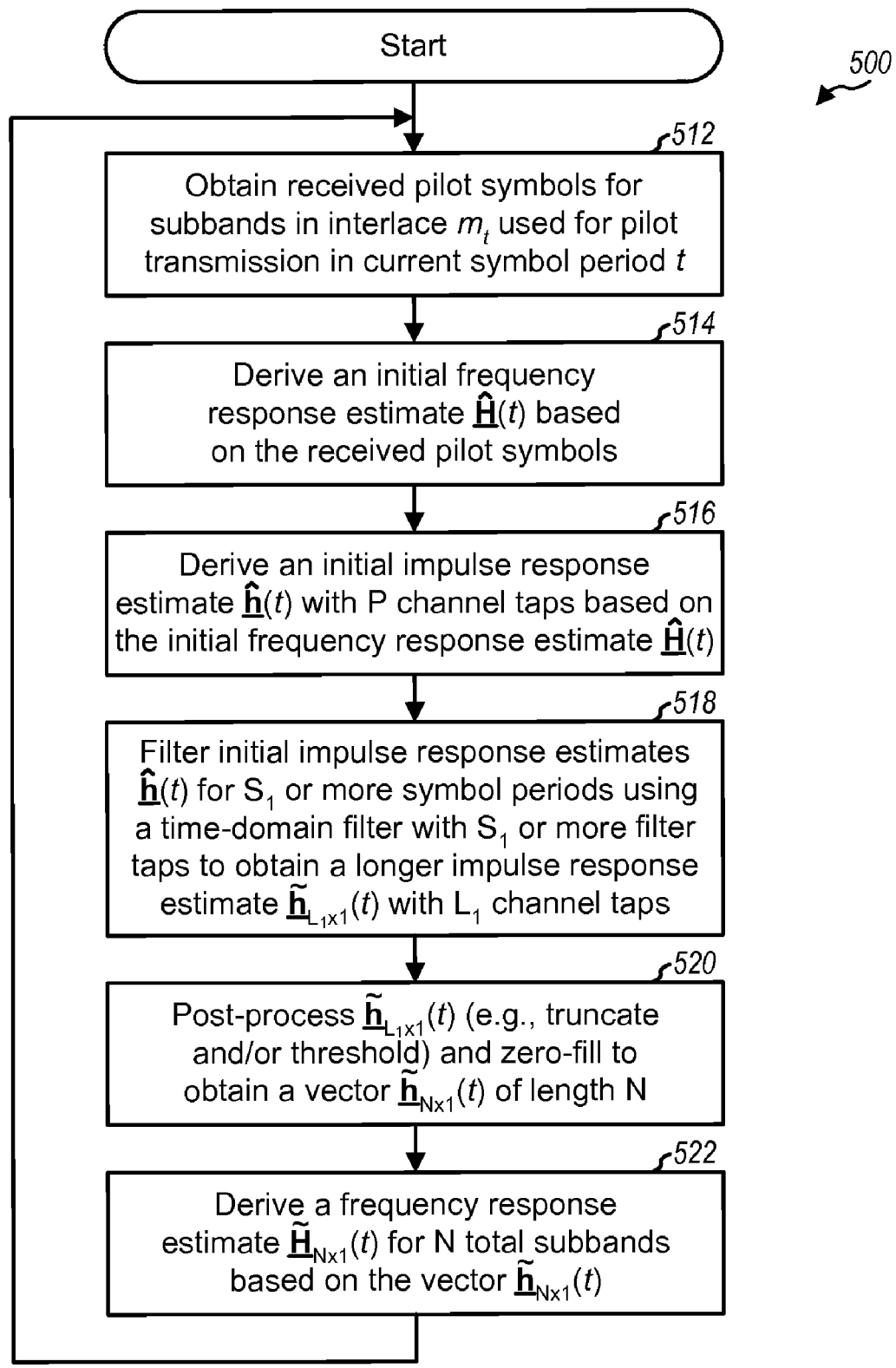
FIG. 5 shows a process for deriving a channel estimate used for data detection.

FIG. 5 shows a flow diagram of a process 500 for deriving a channel estimate used for data detection and decoding. Received pilot symbols are obtained for the subbands in interlace $m_t$ used for pilot transmission in the current symbol period t (block 512). An initial frequency response estimate $\hat{H}(t)$ is derived based on the received pilot symbols, as shown in equation (5) (block 514). An initial impulse response estimate $\hat{h}(t)$ is derived based on the initial frequency response estimate $\hat{H}(t)$, as shown in equation (6) (block 516). Initial impulse response estimates for at least $S_1$ symbol periods are filtered with a time-domain filter having at least $S_1$ taps to obtain a longer impulse response estimate $\tilde{h}_{L_1 \times 1}(t)$ with $L_1$ channel taps, where $L_1 = S_1 \cdot P$ (block 518).

Post-processing may be performed on the $L_1$ channel taps in $\tilde{h}_{L_1 \times 1}(t)$ to further improve channel estimation performance (block 520). The post-processing may include truncation, e.g., setting channel taps P+1 through $L_1$ for the excess channel estimate to zeros. The post-processing may alternatively or additionally include thresholding, e.g., setting channel taps in the main and/or excess channel estimates having energy below a given threshold to zeros. The unprocessed or post-processed longer impulse response estimate $\tilde{h}_{L_1 \times 1}(t)$ may then be extended to length N by zero-padding to obtain a vector $\tilde{h}_{N \times 1}(t)$ of length N (also block 520). An N-point FFT may then be performed on $\tilde{h}_{N \times 1}(t)$ to obtain a frequency response estimate $\tilde{H}_{N \times 1}(t)$ for all N subbands (block 522), as follows:

$$\underline{\tilde{H}}_{N \times 1}(t) = \underline{W}_{N \times N} \cdot \underline{\tilde{h}}_{N \times 1}(t). \quad \text{Eq (20)}$$

Process 500 may be performed for each symbol period with pilot transmission.

$\underline{\tilde{H}}_{N \times 1}(t)$ contains N channel gains for the N total subbands and may be expressed as: $\underline{\tilde{H}}_{N \times 1}(t) = [\underline{\tilde{H}}_1^T(t) \underline{\tilde{H}}_2^T(t) \ldots \underline{\tilde{H}}_M^T(t)]^T$, where $\underline{\tilde{H}}_m(t)$ contains P channel gain estimates for P subbands in interlace m. The M frequency response estimates $\underline{\tilde{H}}_m(t)$ for the M interlaces may have different noise variances depending on the particular staggering pattern used for pilot transmission. In general, a staggering pattern that is more spread out (e.g., staggering pattern 410) may result in less noise variation across $\underline{\tilde{H}}_m(t)$ for the M interlaces than a staggering pattern that is more closely spaced (e.g., staggering pattern 400).

4. Time Tracking

The receiving entity performs time tracking to estimate and track symbol timing across different OFDM symbols. The symbol timing is used to capture a window of N input samples (often called an FFT window) from among the N+C input samples for each received OFDM symbol. Accurate symbol timing is pertinent since performance of both channel estimation and data detection is affected by the placement of the FFT window. The timing of the received OFDM symbol for each symbol period may be estimated by deriving a longer impulse response estimate for that symbol period and detecting for the timing based on an appropriate criterion, e.g. maximizing the energy that falls within the cyclic prefix.

If pilot symbols are available on L different subbands and a timing reference is not available, then a longer impulse response estimate with L channel taps may be derived but only L/2 channel taps may be resolved without any ambiguity. This is because a negative timing error results in earlier channel taps aliasing and appearing at the end of the impulse response estimate. Thus, it is not possible to determine whether the channel taps at the end of the impulse response estimate are later channel taps (if the symbol timing is correct) or earlier channel taps that have aliased (if there is a negative timing error). A longer channel impulse response estimate with up to N channel taps may be obtained by filtering the initial impulse response estimates for M different interlaces. The resolvable length of the communication channel is increased by the use of the longer impulse response estimate.

Figure 6A:
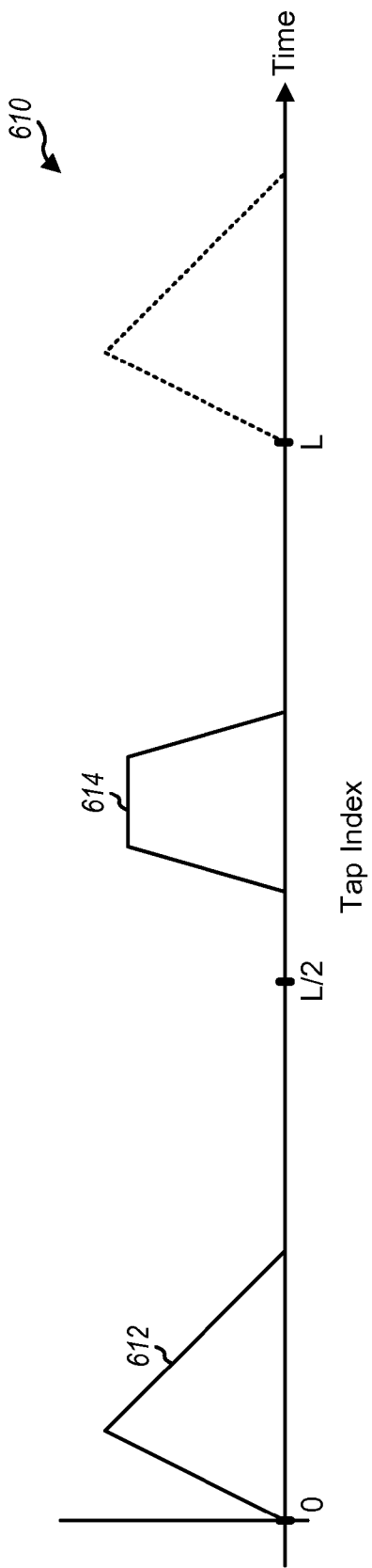
FIGS. 6A and 6B illustrate ambiguity in a channel impulse response estimate due to timing uncertainty.
Figure 6B:
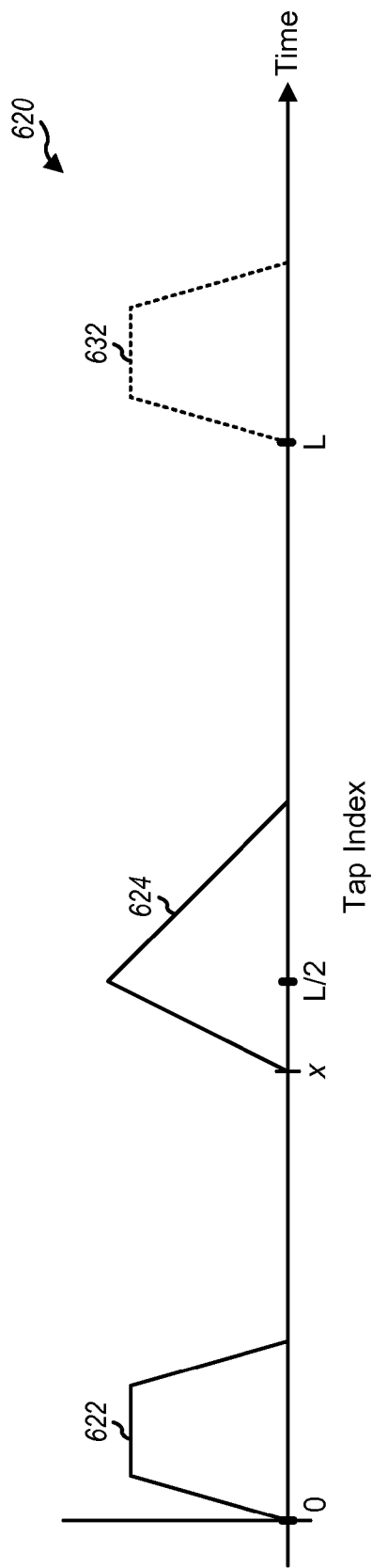

FIGS. 6A and 6B illustrate ambiguity in a channel impulse response estimate due to timing uncertainty. FIG. 6A shows a channel impulse response estimate 610 of length L for an actual channel with an impulse response of length greater than L/2. In FIG. 6A, the symbol timing is correct and channel impulse response estimate 610 properly includes responses 612 and 614 of the actual channel at the proper locations.

FIG. 6B shows an impulse response 620 of length greater than L/2 for another actual channel. If there is no timing error, then a channel impulse response estimate for this channel would include responses 622 and 624 at the locations as shown in FIG. 6B. However, if there is a timing error of x, then response 622 would alias and appear as response 632. Thus, a channel impulse response estimate for this channel, with timing error of x, would be similar to channel impulse response estimate 610 in FIG. 6A FIGS. 6A and 6B illustrate that channel impulse response estimate 610 may be obtained for (1) a channel having the impulse response shown in FIG. 6A, with no timing error, or (2) a channel having the impulse response shown in FIG. 6B, with a timing error of x, and these two cases cannot be distinguished. However, this ambiguity problem would not occur if the channel response lengths are always assumed to be less than L/2. Since the actual channel in FIG. 6B would then have to be longer than L/2 to be mistaken with the channel in FIG. 6A, it can be concluded that the channel response estimate in FIG. 6A does correspond to the true channel. Thus, an initial estimate of length L can resolve a channel of length L/2 with timing uncertainty. A longer channel impulse response estimate is thus desirable for time tracking.

The longer channel impulse response estimate has additional noise due to the excess channel taps, and greater error due to channel time-variations. However, time tracking is likely to be less sensitive to the additional noise since the goal of time tracking is to determine less detailed information such as the general location of the channel energy rather than the complex channel gains of each tap. Thus, the tradeoff between channel quality and length is consistent with the requirements for data detection and time tracking. Specifically, for time tracking, a longer impulse response estimate $\tilde{h}_{3P \times 1}(t)$ with 3P channel taps may provide a good trade-off between resolvable channel length and noise enhancement. For example, if P=512, then $\tilde{h}_{3P \times 1}(t)$ contains 1536 channel taps, and up to 768 channel taps may be resolved without ambiguity. Once the symbol timing is known, the communication channel may be assumed to be 3P/2 taps long for data detection purpose. A 3P/2-tap channel may be estimated by obtaining a longer impulse response estimate with 2P channel taps and truncating the last 256 channel taps.

Figure 7:
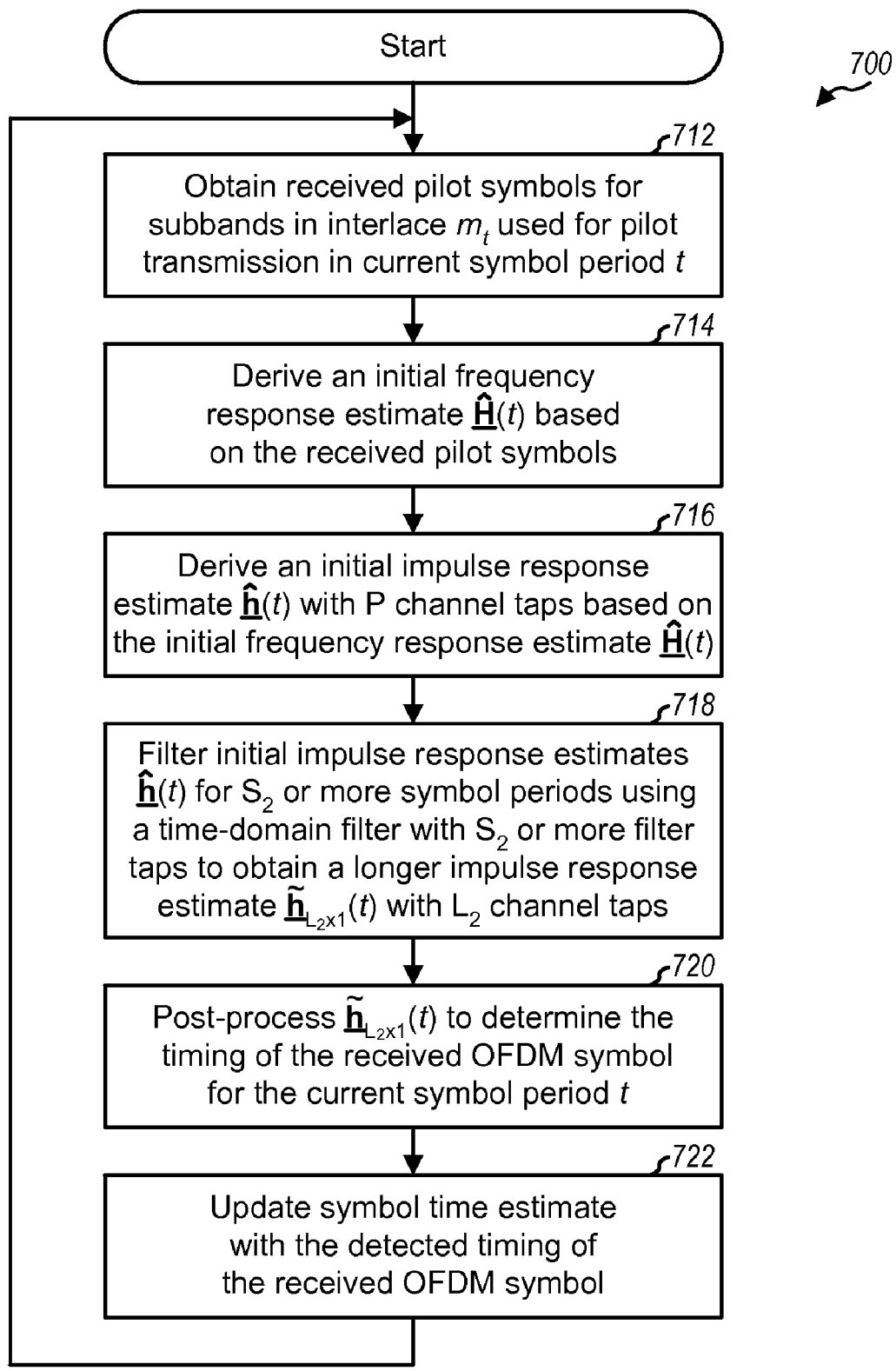
FIG. 7 shows a process for performing time tracking.

FIG. 7 shows a flow diagram of a process 700 for performing time tracking. Blocks 712, 714, 716, and 718 in FIG. 7 are as described above for block 512, 514, 516, and 518, respectively, in FIG. 5. However, a longer impulse response estimate $\tilde{h}_{L_2 \times 1}(t)$ with a different length $L_2$ may be used for time tracking, and a different time-domain filter with at least $S_2$ channel taps may be used to derive $\tilde{h}_{L_2 \times 1}(t)$, where $L_2 = S_2 \cdot P$. The channel estimate $\tilde{h}_{L_2 \times 1}(t)$ is then processed to determine the timing of the received OFDM symbol for the current symbol period t (block 720). One method to determine the timing is as follows. A window of length $L_2/2$ is placed such that the left edge of the window is initially at tap index 1. The energy of all channel taps falling within the window is computed. The window is then moved to the right, one tap position at a time until tap index $L_2/2$ is reached. The channel tap energy is computed for each tap position. The peak energy among all of the $L_2/2$ window starting positions is then determined. If multiple window starting positions have the same peak energy, then the leftmost window starting position with the peak energy is identified. The leftmost window starting position with the peak energy uniquely determines the FFT window for the received OFDM symbol. Timing detection may also be performed using other techniques. In any case, symbol timing estimate is updated with the timing information obtained for the current received OFDM symbol (block 722).

In general, the same or different impulse response estimates may be used for data detection/decoding and time tracking. The use of the same impulse response estimate can reduce the amount of computation at the receiving entity. In this case, the channel length L and the time-domain filter for this impulse response estimate may be selected to provide good performance for both data detection and time tracking. Different impulse response estimates may also be used for data detection/decoding and time tracking in order to achieve better performance for both, and may be derived with two time-domain filters. The channel length and the time-domain filter coefficients for each impulse response estimate may be selected to provide good performance for data detection or time tracking.

Figure 8:
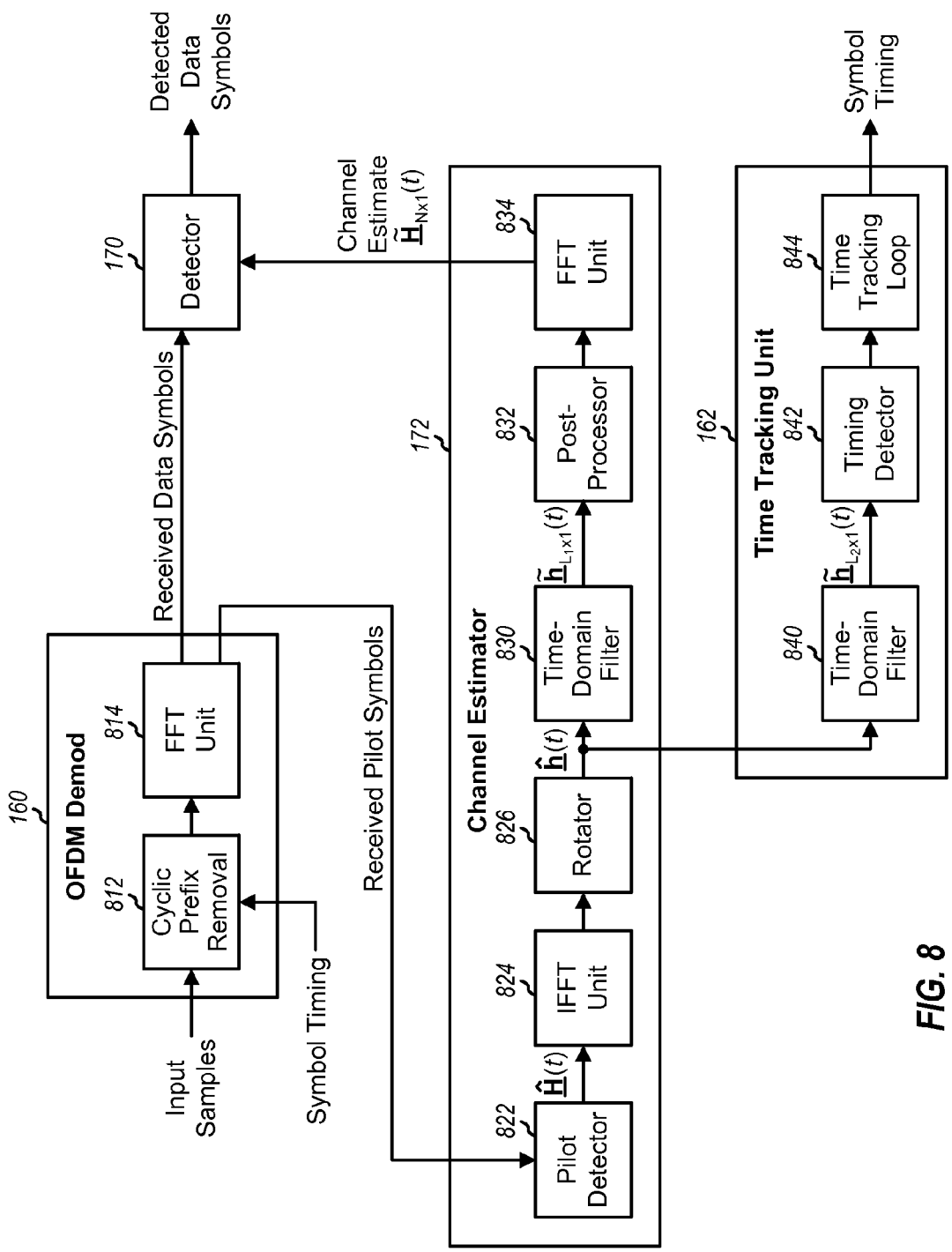
FIG. 8 shows a channel estimator and a time tracking unit.

FIG. 8 shows an embodiment of OFDM demodulator 160, channel estimator 172, and time tracking unit 162 at receiving entity 150. Within OFDM demodulator 160, a cyclic prefix removal unit 812 captures N input samples for each received OFDM symbol based on the symbol timing provided by time tracking unit 162. An FFT unit 814 performs an N-point FFT on each window of N input samples and obtains N received symbols for the N subbands. FFT unit 814 provides received data symbols to detector 170 and received pilot symbols to channel estimator 172. Detector 170 also receives the frequency response estimate $\hat{H}_{N\times1}(t)$ from channel estimator 172, performs data detection on the received data symbols, and provides detected data symbols.

Within channel estimator 172, a pilot detector 822 removes the modulation on the received pilot symbols and may perform extrapolation and/or interpolation to obtain the initial frequency response estimate $\hat{H}(t)$ composed of P channel gains for the P subbands in the interlace used for pilot transmission in the current symbol period t. An IFFT unit 824 performs a P-point IFFT on $\hat{H}(t)$ to obtain the modulated impulse response estimate $\hat{h}_m(t)$ with P channel taps. A rotator 826 removes the phase ramp in the P elements of $\hat{h}_m(t)$ and provides the initial impulse response estimate $\hat{h}(t)$. A time-domain filter 830 filters the initial impulse response estimates $\hat{h}(t)$ obtained for $S_1$ or more interlaces obtained in $S_1$ or more symbol periods and provides the longer impulse response estimate $\tilde{h}_{L\times1}(t)$ with $L_1$ channel taps. A post-processor 832 performs post-processing (e.g., truncation, thresholding, and so on) on $\tilde{h}_{L\times1}(t)$ and provides a vector $\tilde{h}_{N\times1}(t)$ with N channel taps. An FFT unit 834 performs an N-point FFT on $\tilde{h}_{N\times1}$ (t) to obtain the frequency response estimate $\tilde{H}_{N\times1}(t)$ for the N total subbands. Channel estimator 172 may also derive a frequency response estimate $\tilde{H}_m(t)$ for just one or more selected interlaces.

Within time tracking unit 162, a time-domain filter 840 filters the initial impulse response estimates $\hat{h}(t)$ for $S_2$ or more interlaces obtained in $S_2$ or more symbol periods and provides the longer impulse response estimate $\tilde{h}_{L_2\times1}(t)$ with $L_2$ channel taps. A timing detector 842 determines the timing for the current received OFDM symbol, e.g., based on the energy of the channel taps in $\tilde{h}_{L_2\times1}(t)$. A time tracking loop 844 (which may be a loop filter) adjusts the symbol timing from the timing used for the current received OFDM symbol.

Figure 9:
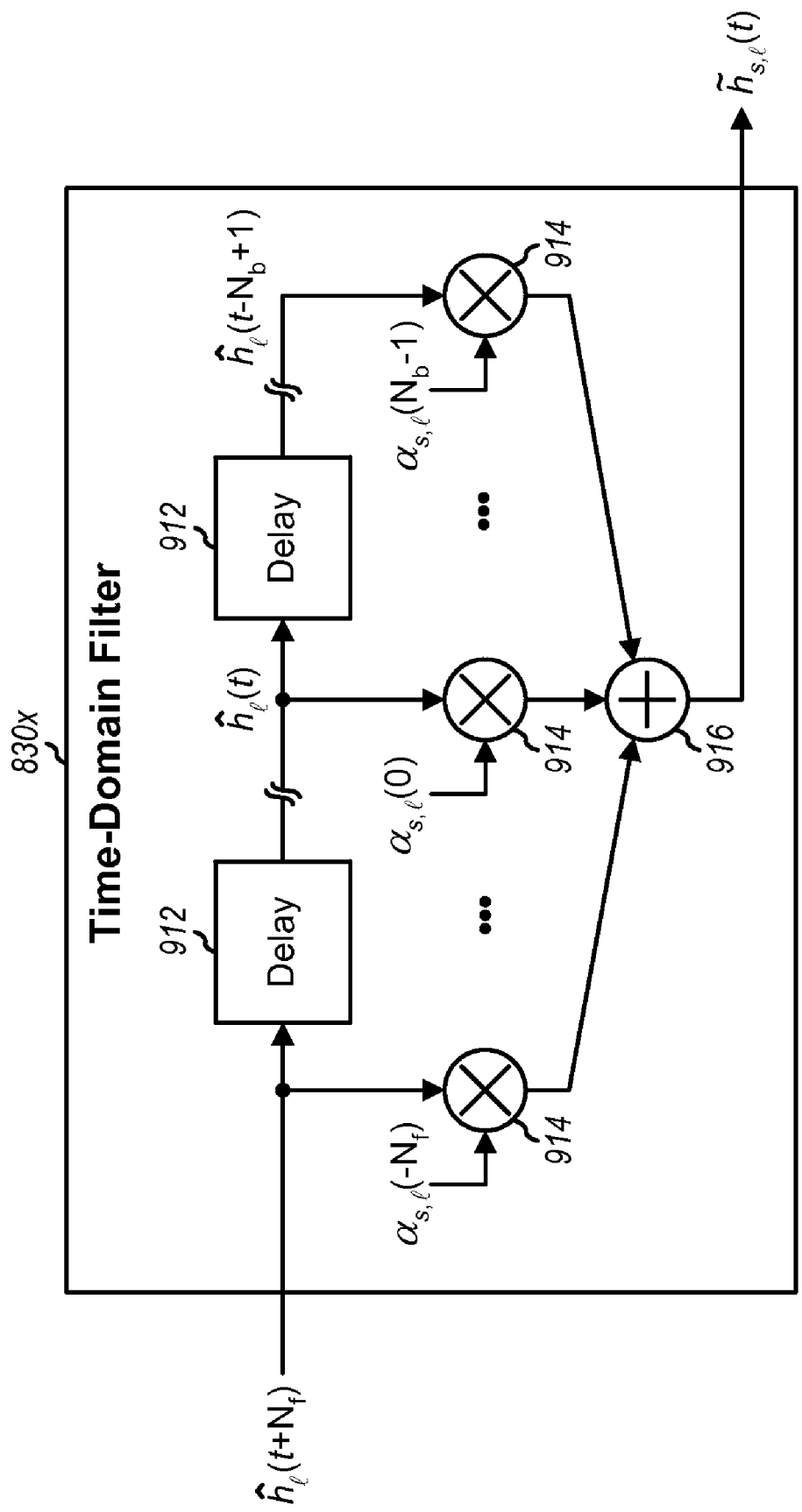
FIG. 9 shows a filter for deriving a longer impulse response estimate.

FIG. 9 shows a block diagram of a time-domain filter 830x, which may be used for filters 830 and 840 in FIG. 8. Within filter 830x, the l-th channel tap in $\hat{h}(t)$ is provided to $N_f+N_b-1$ series-coupled delay elements 912. Each delay element 912 delays its input channel tap by one symbol period. $N_f+N_b-1$ multipliers 914 couple to the input of the $N_f+N_b-1$ delay elements, and one multiplier 914 couples to the output of the last delay element. The $N_f+N_b$ multipliers receive and multiply their channel taps $\hat{h}_l(t+N_f)$ through $\hat{h}_l(t-N_b+1)$ with coefficients $\alpha_{s,l}(-N_f)$ through $\alpha_{s,l}(N_b-1)$, respectively. The same coefficients may be used for all P channel taps in each segment, in which case the coefficients may be denoted as $\alpha_s(-N_f)$ through $\alpha_s(N_b-1)$, without subscript l for tap index. A summer 916 receives and sums the outputs of all $N_f+N_b$ multipliers and provides the l-th channel tap in segment s of $\tilde{h}_{L\times1}(t)$. L may be equal to $L_1$ for data detection and to $L_2$ for time tracking. The filtering for only one channel tap in $\tilde{h}_{L\times1}(t)$ is shown in FIG. 9. The filtering for each of the remaining channel taps in $\tilde{h}_{L\times1}(t)$ may be performed in similar manner.

The pilot transmission, channel estimation, and time tracking techniques described herein may be implemented by various means. For example, these techniques may be implemented in hardware, software, or a combination thereof. For a hardware implementation, the processing units used for pilot transmission at the transmitting entity may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. The processing units used for channel estimation and time tracking at the receiving entity may also be implemented within one or more ASICs, DSPs, and so on.

For a software implementation, these techniques may be implemented with modules (e.g., procedures, functions, and so on) that perform the functions described herein. The software codes may be stored in a memory unit (e.g., memory unit 142 or 192 in FIG. 1) and executed by a processor (e.g., controller 140 or 190). The memory unit may be implemented within the processor or external to the processor.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A method of performing channel estimation and time tracking in a multi-carrier communication system, comprising:

receiving, at a receiver, one or more symbols over a plurality of frequency subbands;

obtaining a plurality of initial impulse response estimates for a plurality of different groups of the plurality of frequency subbands, wherein each group includes a different plurality of frequency subbands selected from among N frequency subbands in the system, where N is an integer greater than one;

processing a first set of initial impulse response estimates, from among the plurality of initial impulse response estimates, to obtain a first impulse response estimate of length $L_1$ and used for data detection and decoding, where $L_1$ is an integer one or greater; and processing a second set of initial impulse response estimates, from among the plurality of initial impulse response estimates, to obtain a second impulse response estimate of length $L_2$ and used for time tracking, wherein $L_2$ is longer than $L_1$.

2. The method of claim 1, wherein each of the plurality of groups includes P frequency subbands, where P is an integer greater than one.

3. The method of claim 2, wherein the P frequency subbands in each group are uniformly distributed across the N frequency subbands.

4. The method of claim 2, wherein $L_1$ is equal to $S_1$ times P and $L_2$ is equal to $S_2$ times P, where $S_1$ and $S_2$ are integers greater than one and $S_2$ is greater than or equal to $S_1$.

5. The method of claim 2, wherein $L_1$ is equal to two times P and $L_2$ is equal to three times P.

6. The method of claim 4, wherein the first impulse response estimate comprises $L_1$ channel taps arranged in $S_1$ segments, each segment including P consecutive channel taps, and wherein the P channel taps in each segment are obtained based on a set of filter coefficients for the segment.

7. The method of claim 6, wherein a first segment of P channel taps for the first impulse response estimate is for a main channel, and wherein remaining ones of the $S_1$ segments for the first impulse response estimate are for an excess channel.

8. The method of claim 7, wherein the set of filter coefficients for the first segment of P channel taps is selected to cancel contribution from the excess channel, suppress time variation in the main channel, provide an unbiased estimate of the main channel, minimize a norm of the filter coefficients, or a combination thereof.

9. The method of claim 7, wherein the set of filter coefficients for a second segment of P channel taps, for one of the remaining ones of the $S_1$ segments for the first impulse response estimate, is selected to cancel contribution from the main channel, suppress time variation in the main channel, suppress time variation in the excess channel, provide an unbiased estimate of the second segment of P channel taps, minimize a norm of the filter coefficients, or a combination thereof.

10. The method of claim 4, wherein the first set includes $S_1$ initial impulse response estimates, where $S_1$ is an integer greater than one, and wherein the first impulse response estimate is derived with a filter having $S_1$ taps for the $S_1$ initial impulse response estimates.

11. The method of claim 10, wherein $S_1$ is equal to two.

12. The method of claim 4, wherein the second impulse response estimate comprises $L_2$ channel taps arranged in $S_2$ segments, each segment including P consecutive channel taps, and wherein the P channel taps in each segment are obtained based on a set of filter coefficients for the segment.

13. The method of 6, wherein the second impulse response estimate comprises $L_2$ channel taps arranged in $S_2$ segments, each segment including P consecutive channel taps, wherein the P channel taps in each segment are obtained based on a set of filter coefficients for the segment, and wherein the filter coefficients used for the first impulse response estimate are different from the filter coefficients used for the second impulse response estimate.

14. The method of claim 1, wherein the first impulse response estimate comprises $L_1$ channel taps, and wherein the second impulse response estimate comprises the $L_1$ channel taps of the first channel impulse response estimate and ($L_2 - L_1$) additional channel taps.

15. The method of claim 1, wherein the second set includes $S_2$ initial impulse response estimates, where $S_2$ is an integer greater than one, and wherein the second impulse response estimate is derived with a filter having $S_2$ taps for the $S_2$ initial impulse response estimates.

16. The method of claim 1, further comprising: processing the first impulse response estimate to obtain a frequency response estimate for at least one group of frequency subbands.

17. The method of claim 16, wherein the processing the first impulse response estimate comprises setting channel taps in the first impulse response estimate with energy less than a predetermined threshold to zero.

18. The method of claim 16, wherein the processing the first impulse response estimate comprises setting a predetermined number of latest channel taps in the first impulse response estimate to zero.

19. The method of claim 1, further comprising: determining a time instant with a predominant amount of energy in the second impulse response estimate; and deriving symbol timing with the time instant determined for the second impulse response estimate.

20. The method of claim 1, further comprising: obtaining a plurality of initial frequency response estimates for the plurality of different groups of the plurality of frequency subbands; and processing each of the plurality of initial frequency response estimates to obtain a corresponding one of the plurality of initial impulse response estimates.

21. The method of claim 20, wherein the processing each of the plurality of initial frequency response estimates comprises transforming the initial frequency response estimate to obtain a modulated impulse response estimate, and rotating channel taps in the modulated impulse response estimate to obtain the corresponding initial impulse response estimate.

22. An apparatus in a multi-carrier communication system, comprising:
a processing unit operative to obtain a plurality of initial impulse response estimates for a plurality of different groups of frequency subbands, wherein each group includes a different plurality of frequency subbands selected from among N frequency subbands in the system, where N is an integer greater than one;
a first filter operative to process a first set of initial impulse response estimates, from among the plurality of initial impulse response estimates, to obtain a first impulse response estimate of length $L_1$ and used for data detection and decoding, where $L_1$ is an integer one or greater; and
a second filter operative to process a second set of initial impulse response estimates, from among the plurality of initial impulse response estimates, to obtain a second impulse response estimate of length $L_2$ and used for time tracking, wherein $L_2$ is longer than $L_1$.

23. The apparatus of claim 22, wherein each of the first and second impulse response estimates comprises multiple segments, each segment including P consecutive channel taps, and wherein the P channel taps in each segment are derived based on a set of filter coefficients for the segment.

24. The apparatus of claim 22, wherein the set of filter coefficients for each segment of each of the first and second impulse response estimates is selected to cancel contribution from remaining ones of the multiple segments, suppress time variation in the segment, suppress time variation in one or more remaining segments, provide an unbiased estimate of the segment, minimize a norm of the filter coefficients, or a combination thereof.

25. The apparatus of claim 22, further comprising: a transform unit operative to process the first impulse response estimate to obtain a frequency response estimate for at least one group of frequency subbands.

26. The apparatus of claim 22, further comprising: a timing detector operative to determine a time instant with a predominant amount of energy in the second impulse response estimate; and a time tracking loop operative to derive symbol timing with the time instant determined for the second impulse response estimate.

27. An apparatus in a multi-carrier communication system, comprising:
   means for obtaining a plurality of initial impulse response estimates for a plurality of different groups of frequency subbands, wherein each group includes a different plurality of frequency subbands selected from among N frequency subbands in the system, where N is an integer greater than one;
   means for processing a first set of initial impulse response estimates, from among the plurality of initial impulse response estimates, to obtain a first impulse response estimate of length $L_1$ and used data detection and decoding, where $L_1$ is an integer one or greater; and
   means for processing a second set of initial impulse response estimates, from among the plurality of initial impulse response estimates, to obtain a second impulse response estimate of length $L_2$ and used for time tracking, wherein $L_2$ is longer than $L_1$.

28. The apparatus of claim 27, wherein each of the first and second impulse response estimates comprises multiple segments, each segment including P consecutive channel taps, and wherein the P channel taps in each segment are derived based on a set of filter coefficients for the segment.

29. A computer program product, comprising:
   a computer-readable medium, comprising:
      code for causing at least one computer to obtain a plurality of initial impulse response estimates for a plurality of different groups of frequency subbands, wherein each group includes a different plurality of frequency subbands selected from among N frequency subbands in the system, where N is an integer greater than one;
      code for causing the at least one computer to process a first set of initial impulse response estimates, from among the plurality of initial impulse response estimates, to obtain a first impulse response estimate of length $L_1$ and used data detection and decoding, where $L_1$ is an integer one or greater; and
      code for causing the at least one computer to process a second set of initial impulse response estimates, from among the plurality of initial impulse response estimates, to obtain a second impulse response estimate of length $L_2$ and used for time tracking, wherein $L_2$ is longer than $L_1$.

30. The computer program product of claim 29, wherein each of the first and second impulse response estimates comprises multiple segments, each segment including P consecutive channel taps, and wherein the P channel taps in each segment are derived based on a set of filter coefficients for the segment.

* * * * *